US012315317B2

(12) United States Patent
Turiello

(10) Patent No.: US 12,315,317 B2
(45) Date of Patent: May 27, 2025

(54) METHOD AND SYSTEM OF SENSOR-BASED SMART UNLOCKING OF A FIREFIGHTER AIR REPLENISHMENT SYSTEM

(71) Applicant: RESCUE AIR SYSTEMS, INC., San Carlos, CA (US)

(72) Inventor: Anthony J. Turiello, Redwood City, CA (US)

(73) Assignee: Rescue Air Systems, Inc., San Carlos, CA (US)

( * ) Notice: Subject to any disclaimer, the term of this patent is extended or adjusted under 35 U.S.C. 154(b) by 212 days.

(21) Appl. No.: 18/103,498

(22) Filed: Jan. 31, 2023

(65) Prior Publication Data

US 2024/0005715 A1 Jan. 4, 2024

Related U.S. Application Data

(60) Provisional application No. 63/357,145, filed on Jun. 30, 2022, provisional application No. 63/356,996, filed on Jun. 29, 2022.

(51) Int. Cl.

| | |
|---|---|
| ***G07C 9/00*** | (2020.01) |
| ***A62B 7/02*** | (2006.01) |
| ***A62B 9/00*** | (2006.01) |

(52) U.S. Cl.
CPC ............ *G07C 9/00896* (2013.01); *A62B 7/02* (2013.01); *A62B 9/006* (2013.01)

(58) Field of Classification Search
None
See application file for complete search history.

(56) References Cited

U.S. PATENT DOCUMENTS

| | | | |
|---|---|---|---|
| 2,341,113 | A | 2/1944 | Nelson |
| 3,925,763 | A | 12/1975 | Wadhwani et al. |

(Continued)

FOREIGN PATENT DOCUMENTS

| | | | |
|---|---|---|---|
| AR | 070623 A1 | | 4/2010 |
| AU | 2019101454 A4 | | 1/2020 |

(Continued)

OTHER PUBLICATIONS

"Chapter 6 Fire-Fighting Systems" https://www.globalsecurity.org/military/library/policy/navy/nrtc/14057_ppr_ch6.pdf.

(Continued)

*Primary Examiner* — K. Wong
(74) *Attorney, Agent, or Firm* — Foley & Lardner LLP

(57) ABSTRACT

Disclosed are methods and a system of sensor-based smart unlocking of a firefighter air replenishment system. A safety system of an occupiable structure includes a breathable-air supply system to facilitate delivery of breathable air from a source of compressed air, and a fill station in a fire-rated evacuation area of the occupiable structure to supply the breathable air to an emergency personnel. The safety system also includes a smart lock associated with the breathable-air supply system to automatically unlock one or more location(s) of the breathable-air supply system usable by the emergency personnel to access the breathable air during an emergency state of the occupiable structure, and a sensor associated with the breathable-air supply system to detect the emergency state of the occupiable structure.

32 Claims, 7 Drawing Sheets

(56) References Cited

U.S. PATENT DOCUMENTS 4,023,146 A 5/1977 Carroll
4,091,874 A 5/1978 Monma
4,336,590 A 6/1982 Jaco et al.
4,373,522 A 2/1983 Zien
4,375,637 A 3/1983 Desjardins
4,467,796 A 8/1984 Beagley
4,570,719 A 2/1986 Wilk
4,856,565 A 8/1989 Schoeffl et al.
5,163,422 A 11/1992 Burgess
5,396,885 A 3/1995 Nelson
5,497,855 A 3/1996 Moore
5,507,283 A 4/1996 Grivas
5,536,690 A 7/1996 Greer et al.
5,564,626 A 10/1996 Kettler et al.
5,570,685 A * 11/1996 Turiello .................. A62B 7/00 128/202.13
5,707,005 A 1/1998 Kettler et al.
5,720,659 A 2/1998 Wicks
5,800,260 A 9/1998 Kao
5,992,532 A 11/1999 Ramsey et al.
6,310,552 B1 10/2001 Stumberg et al.
6,357,532 B1 3/2002 Laskaris et al.
6,369,716 B1 4/2002 Abbas et al.
6,401,487 B1 6/2002 Kotliar
6,418,752 B2 7/2002 Kotliar
6,488,026 B2 12/2002 Lauer
6,502,421 B2 1/2003 Kotliar
6,543,444 B1 4/2003 Lewis
6,585,583 B1 7/2003 Chan
6,647,301 B1 11/2003 Sederlund et al.
6,712,071 B1 3/2004 Parker
6,810,910 B2 11/2004 McHugh
6,832,952 B2 12/2004 Faltesek et al.
6,866,102 B2 3/2005 Boyce et al.
6,873,256 B2 3/2005 Pedersen et al.
6,920,874 B1 7/2005 Siegel
6,940,403 B2 9/2005 Kail et al.
6,999,562 B2 2/2006 Winick
7,091,852 B2 8/2006 Mason et al.
7,124,833 B2 10/2006 Sant'Angelo
7,161,481 B2 1/2007 Turner
7,168,428 B1 1/2007 Zoha
7,186,084 B2 3/2007 Bunker et al.
7,221,260 B2 5/2007 Berezowski et al.
7,250,000 B2 7/2007 Daniels, II
7,302,313 B2 11/2007 Sharp et al.
7,347,204 B1 3/2008 Lindsey et al.
7,377,835 B2 5/2008 Parkulo et al.
7,468,082 B2 12/2008 Gordon
7,509,968 B2 3/2009 Surawski
7,527,056 B2 5/2009 Turiello
7,548,833 B2 6/2009 Ahmed
7,598,856 B1 10/2009 Nick et al.
7,621,269 B2 11/2009 Turiello
7,654,279 B2 2/2010 Horton et al.
7,658,190 B1 2/2010 Phifer et al.
7,673,629 B2 * 3/2010 Turiello .................. E21F 11/00 52/173.3
7,677,247 B2 3/2010 Turiello
7,694,678 B2 4/2010 Turiello
7,710,282 B1 5/2010 Young
7,765,072 B2 7/2010 Eller et al.
7,770,610 B2 * 8/2010 Lisle ...................... A62B 99/00 141/54
7,804,402 B2 9/2010 Lang et al.
7,823,609 B2 11/2010 Wonders
7,857,068 B2 12/2010 Wagner
7,880,607 B2 2/2011 Olson et al.
7,921,869 B2 4/2011 Surawski
7,934,411 B2 5/2011 Koch
7,953,228 B2 5/2011 Faltesek et al.
7,975,729 B2 7/2011 Lisle
8,074,278 B2 12/2011 Law et al.
8,114,954 B2 2/2012 DeBruin
8,116,913 B2 2/2012 Mirpourian et al.
8,147,302 B2 4/2012 Desrochers et al.
8,149,109 B2 4/2012 Lontka
8,219,249 B2 7/2012 Harrod et al.
8,291,941 B1 10/2012 Berardi
8,371,295 B2 2/2013 Turiello
8,375,876 B2 2/2013 Van Tassel
8,375,948 B2 2/2013 Turiello
8,381,726 B2 2/2013 Turiello
8,413,653 B2 4/2013 Turiello
8,443,800 B2 5/2013 Turiello
8,517,896 B2 8/2013 McLoughlin et al.
8,538,687 B2 9/2013 Plocher et al.
8,573,317 B2 11/2013 Krüger et al.
8,602,119 B2 12/2013 Wagner
8,611,323 B2 12/2013 Berger et al.
8,668,023 B2 3/2014 Wilkins et al.
8,701,718 B1 4/2014 Turiello
8,733,355 B2 5/2014 Turiello
8,745,792 B2 6/2014 McGlynn
8,755,839 B2 6/2014 Parkulo et al.
8,770,190 B2 7/2014 Doherty et al.
8,773,946 B2 7/2014 Padmanabhan et al.
8,795,041 B2 8/2014 Saito et al.
8,797,141 B2 8/2014 Best et al.
8,797,210 B2 8/2014 Derrick et al.
8,866,618 B2 10/2014 Cotten et al.
8,995,946 B2 3/2015 Miller
9,010,019 B2 4/2015 Mittelmark
9,032,994 B2 5/2015 McHugh et al.
9,033,061 B2 5/2015 Chattaway et al.
9,105,171 B2 8/2015 Flood et al.
9,109,981 B2 8/2015 Sharp
9,175,975 B2 11/2015 Shtukater
9,220,937 B2 12/2015 Wagner
9,234,661 B2 1/2016 Young et al.
9,235,975 B2 1/2016 Gettings et al.
9,242,126 B2 1/2016 Turiello
9,243,753 B2 1/2016 Wonders
9,328,936 B2 5/2016 Meirav et al.
9,347,677 B2 5/2016 Eberlein et al.
9,404,666 B2 8/2016 Terlson et al.
9,466,199 B2 10/2016 McNabb et al.
9,468,157 B2 10/2016 Hu
9,564,028 B2 2/2017 Cerrano
9,566,608 B2 2/2017 Tran
9,670,670 B2 6/2017 Teron
9,671,794 B1 6/2017 Lymberopoulos et al.
9,682,257 B2 6/2017 Zhao et al.
9,702,802 B2 7/2017 Ajay et al.
9,724,484 B2 8/2017 Robey
9,733,149 B2 8/2017 Eberlein
9,829,895 B2 11/2017 McLoughlin et al.
9,852,604 B2 12/2017 Poder
9,875,631 B2 1/2018 Mittleman et al.
9,927,066 B1 3/2018 Wonders
9,933,115 B2 4/2018 Rado et al.
9,964,470 B2 5/2018 Sharp
10,042,164 B2 8/2018 Kuutti et al.
10,044,857 B2 8/2018 Philbin
10,052,509 B2 8/2018 Wagner
10,062,233 B1 8/2018 Rogers et al.
10,074,295 B2 9/2018 Hyman
10,078,865 B2 9/2018 Joshi et al.
10,121,361 B2 11/2018 Deluliis et al.
10,124,196 B2 11/2018 Roberts
10,139,282 B2 11/2018 Chrostowski
10,156,320 B2 12/2018 Toelle
10,192,411 B2 1/2019 Wedig et al.
10,311,444 B1 6/2019 Conboy
10,380,862 B1 8/2019 Heidary
10,380,863 B2 8/2019 Wedig et al.
10,400,442 B2 9/2019 Power et al.
10,417,451 B2 9/2019 Park et al.
10,426,064 B2 9/2019 Slessman et al.
10,490,055 B2 11/2019 Myllymäki
10,503,180 B2 12/2019 Blackley
10,529,215 B2 1/2020 Brown
10,563,886 B2 2/2020 McCormick et al.
10,639,508 B2 5/2020 Müller et al.

(56) References Cited

U.S. PATENT DOCUMENTS

| | | | |
|---|---|---|---|
| 10,738,943 | B2 | 8/2020 | Tilhof |
| 10,767,803 | B2 | 9/2020 | Leahy |
| 10,789,665 | B2 | 9/2020 | Comello |
| 10,808,396 | B2 | 10/2020 | Zhang et al. |
| 10,834,482 | B2 | 11/2020 | Speicher et al. |
| 10,890,294 | B2 | 1/2021 | Santos et al. |
| 10,901,373 | B2 | 1/2021 | Locke et al. |
| 10,969,131 | B2 | 4/2021 | Sinha et al. |
| 11,009,186 | B2 | 5/2021 | Sung |
| 11,027,236 | B2 | 6/2021 | Maayan et al. |
| 11,055,973 | B2 | 7/2021 | Wedig et al. |
| 11,070,390 | B2 | 7/2021 | Park et al. |
| 11,111,767 | B2 | 9/2021 | Anders |
| 11,135,461 | B2 | 10/2021 | Beechy et al. |
| 11,162,181 | B2 | 11/2021 | Harano et al. |
| 11,181,875 | B2 | 11/2021 | Kummer et al. |
| 11,185,650 | B2 | 11/2021 | Almqvist |
| 11,187,223 | B2 | 11/2021 | Ward et al. |
| 11,191,222 | B2 | 12/2021 | Cho et al. |
| 11,226,604 | B2 | 1/2022 | Goyal |
| 11,238,187 | B2 | 2/2022 | Nikolayev et al. |
| 11,391,474 | B2 | 7/2022 | Eplee |
| 11,410,539 | B2 | 8/2022 | Kasiviswanathan |
| 11,439,856 | B2 | 9/2022 | Laskaris et al. |
| 11,514,764 | B2 | 11/2022 | Correnti et al. |
| 11,536,476 | B2 | 12/2022 | Nesler et al. |
| 2002/0121381 | A1 | 9/2002 | Reilly |
| 2002/0185283 | A1 | 12/2002 | Taylor |
| 2003/0183300 | A1 | 10/2003 | Siebert |
| 2006/0005880 | A1 | 1/2006 | Baker et al. |
| 2006/0173579 | A1 | 8/2006 | Desrochers et al. |
| 2006/0234621 | A1 | 10/2006 | Desrochers et al. |
| 2007/0163578 | A1 | 7/2007 | Lisle |
| 2007/0175470 | A1 | 8/2007 | Brookman et al. |
| 2008/0041377 | A1 | 2/2008 | Turiello |
| 2008/0041378 | A1 | 2/2008 | Turiello |
| 2008/0041379 | A1 | 2/2008 | Turiello |
| 2008/0105443 | A1 | 5/2008 | Molz et al. |
| 2008/0236846 | A1 | 10/2008 | Gamble et al. |
| 2009/0159365 | A1 | 6/2009 | O'Brien |
| 2009/0178675 | A1 | 7/2009 | Turiello |
| 2010/0031955 | A1 | 2/2010 | Turiello |
| 2010/0032040 | A1 | 2/2010 | Turiello |
| 2010/0081411 | A1 | 4/2010 | Montenero |
| 2010/0147297 | A1 | 6/2010 | Brewer et al. |
| 2010/0154922 | A1 | 6/2010 | Turiello |
| 2010/0201536 | A1 | 8/2010 | Robertson et al. |
| 2011/0187524 | A1 | 8/2011 | Cochran, III |
| 2011/0192479 | A1 | 8/2011 | Yokota |
| 2011/0259580 | A1 | 10/2011 | Head |
| 2011/0277490 | A1 | 11/2011 | Meirav |
| 2012/0031525 | A1 | 2/2012 | Wonders |
| 2012/0266889 | A1 | 10/2012 | Roberts |
| 2013/0033377 | A1 | 2/2013 | Hoseit |
| 2013/0086933 | A1 | 4/2013 | Holtkamp et al. |
| 2013/0105010 | A1 | 5/2013 | McLoughlin |
| 2014/0188286 | A1 | 7/2014 | Hunka |
| 2014/0232876 | A1 | 8/2014 | Dougherty |
| 2014/0338927 | A1 | 11/2014 | Palle |
| 2015/0033765 | A1 | 2/2015 | Blalock |
| 2015/0077737 | A1 | 3/2015 | Belinsky et al. |
| 2015/0096768 | A1 | 4/2015 | DuBrucq et al. |
| 2015/0130205 | A1 | 5/2015 | Caskey |
| 2015/0131262 | A1 | 5/2015 | Mabry |
| 2015/0170486 | A1 | 6/2015 | Penland |
| 2015/0204484 | A1 | 7/2015 | Modirzareh et al. |
| 2015/0217518 | A1 | 8/2015 | Chun et al. |
| 2015/0369498 | A1 | 12/2015 | Motomura et al. |
| 2016/0003524 | A1 | 1/2016 | Blalock |
| 2016/0114196 | A1 | 4/2016 | Tribble |
| 2016/0116181 | A1 | 4/2016 | Aultman et al. |
| 2016/0133108 | A1 | 5/2016 | Bucsa et al. |
| 2016/0136017 | A1 | 5/2016 | Caskey |
| 2016/0197772 | A1 | 7/2016 | Britt et al. |
| 2016/0334061 | A1 | 11/2016 | Toelle |
| 2016/0343187 | A1 | 11/2016 | Trani |
| 2017/0006107 | A1 | 1/2017 | Dawes et al. |
| 2017/0084156 | A1 | 3/2017 | Myllymäki |
| 2017/0122580 | A1 | 5/2017 | Karamanos et al. |
| 2017/0180829 | A1 | 6/2017 | Schwarzkopf et al. |
| 2017/0236397 | A1 | 8/2017 | Myslenski |
| 2017/0303580 | A1 | 10/2017 | Cameron et al. |
| 2017/0310498 | A1 | 10/2017 | Brandman et al. |
| 2018/0181094 | A1 | 6/2018 | Funk et al. |
| 2018/0197393 | A1 | 7/2018 | Gallo et al. |
| 2018/0200552 | A1 | 7/2018 | Wertsberger |
| 2018/0243591 | A1 | 8/2018 | DeWitt |
| 2018/0283614 | A1 | 10/2018 | Gandolfo |
| 2018/0375444 | A1 | 12/2018 | Gamroth |
| 2019/0023529 | A1 | 1/2019 | Lau |
| 2019/0103986 | A1 | 4/2019 | Brandman et al. |
| 2019/0143161 | A1 | 5/2019 | Burkhart et al. |
| 2019/0171780 | A1 | 6/2019 | Santarone et al. |
| 2019/0174208 | A1 | 6/2019 | Speicher et al. |
| 2019/0203885 | A1 | 7/2019 | Sung |
| 2019/0282839 | A1 | 9/2019 | Wenzel et al. |
| 2020/0012307 | A1 | 1/2020 | Scelzi |
| 2020/0054905 | A1 | 2/2020 | Livchak et al. |
| 2020/0107475 | A1 | 4/2020 | Keisling et al. |
| 2020/0143300 | A1 | 5/2020 | Weldemariam et al. |
| 2020/0225313 | A1 | 7/2020 | Coles |
| 2020/0232309 | A1 | 7/2020 | Deutch et al. |
| 2020/0294372 | A1* | 9/2020 | Rodriguez ............. G08B 7/062 |
| 2020/0334778 | A1 | 10/2020 | Lotter |
| 2020/0349661 | A1 | 11/2020 | Dutta et al. |
| 2021/0023323 | A1 | 1/2021 | Wilkinson et al. |
| 2021/0038926 | A1 | 2/2021 | Reedy |
| 2021/0113864 | A1 | 4/2021 | Nam |
| 2021/0183218 | A1 | 6/2021 | Johnson et al. |
| 2021/0237309 | A1 | 8/2021 | Tessien |
| 2021/0241595 | A1 | 8/2021 | Young et al. |
| 2021/0268322 | A1 | 9/2021 | Thomas et al. |
| 2021/0280034 | A1 | 9/2021 | Wedig et al. |
| 2021/0299495 | A1 | 9/2021 | Feenstra et al. |
| 2021/0311008 | A1 | 10/2021 | Hill |
| 2021/0358238 | A1 | 11/2021 | Rogers et al. |
| 2021/0379429 | A1 | 12/2021 | Darnell |
| 2022/0010996 | A1 | 1/2022 | Carrieri |
| 2022/0099641 | A1 | 3/2022 | Desrochers |
| 2022/0134147 | A1 | 5/2022 | Webb et al. |
| 2022/0233900 | A1 | 7/2022 | Williams |
| 2022/0260270 | A1 | 8/2022 | Abate et al. |
| 2022/0404056 | A1 | 12/2022 | Bloemer et al. |
| 2023/0034481 | A1 | 2/2023 | Benton et al. |
| 2023/0070772 | A1 | 3/2023 | Bingham et al. |
| 2023/0298346 | A1* | 9/2023 | Alshammary ....... G08B 29/043 382/103 |
| 2023/0319241 | A1* | 10/2023 | Turiello ................. H04N 7/188 348/143 |

FOREIGN PATENT DOCUMENTS

| | | | |
|---|---|---|---|
| AU | 2021105506 | A4 | 11/2021 |
| CA | 2760676 | A1 | 11/2010 |
| CN | 101853549 | A | 10/2010 |
| CN | 101968244 | A | 2/2011 |
| CN | 201775882 | U | 3/2011 |
| CN | 202052220 | U | 11/2011 |
| CN | 202078672 | U | 12/2011 |
| CN | 202615547 | U | 12/2012 |
| CN | 102739786 | B | 4/2013 |
| CN | 101298769 | B1 | 8/2013 |
| CN | 203154649 | U | 8/2013 |
| CN | 203160791 | U | 8/2013 |
| CN | 203190560 | U | 9/2013 |
| CN | 102364016 | B | 2/2014 |
| CN | 102500021 | B | 7/2014 |
| CN | 203799482 | U | 8/2014 |
| CN | 102365458 | B | 9/2014 |
| CN | 104056374 | A | 9/2014 |
| CN | 104826248 | A | 8/2015 |
| CN | 204534128 | U | 8/2015 |
| CN | 104906717 | A | 9/2015 |
| CN | 205031799 | U | 2/2016 |

(56) References Cited

FOREIGN PATENT DOCUMENTS

| | | | |
|---|---|---|---|
| CN | 104260763 | B | 8/2016 |
| CN | 105917208 | A | 8/2016 |
| CN | 106310553 | A | 1/2017 |
| CN | 106899665 | A | 6/2017 |
| CN | 105143778 | B | 8/2017 |
| CN | 105247269 | A | 9/2017 |
| CN | 206808757 | U | 12/2017 |
| CN | 107991999 | A | 5/2018 |
| CN | 105892538 | B | 8/2018 |
| CN | 207750720 | U | 8/2018 |
| CN | 106546008 | A | 9/2018 |
| CN | 105091097 | B | 1/2019 |
| CN | 105547285 | A | 1/2019 |
| CN | 208536257 | U | 2/2019 |
| CN | 109859368 | A | 6/2019 |
| CN | 109939387 | A | 6/2019 |
| CN | 110469950 | A | 11/2019 |
| CN | 110478804 | A | 11/2019 |
| CN | 110494811 | A | 11/2019 |
| CN | 110673739 | A | 1/2020 |
| CN | 209926530 | U | 1/2020 |
| CN | 210135667 | U | 3/2020 |
| CN | 111210588 | A | 5/2020 |
| CN | 210739978 | U | 6/2020 |
| CN | 111544817 | A | 8/2020 |
| CN | 110047240 | B | 10/2020 |
| CN | 109404582 | B | 11/2020 |
| CN | 112344484 | A | 2/2021 |
| CN | 212491267 | U | 2/2021 |
| CN | 112657081 | A | 4/2021 |
| CN | 108295407 | B | 5/2021 |
| CN | 111258251 | A | 5/2021 |
| CN | 113365029 | A | 9/2021 |
| CN | 110493568 | B | 10/2021 |
| CN | 111243219 | A | 11/2021 |
| CN | 214550694 | U | 11/2021 |
| CN | 113769292 | A | 12/2021 |
| CN | 113842716 | A | 12/2021 |
| CN | 114146332 | A | 3/2022 |
| CN | 114205385 | A | 3/2022 |
| CN | 114235301 | A | 3/2022 |
| CN | 106678991 | B | 5/2022 |
| CN | 114613092 | A | 6/2022 |
| CN | 216855578 | U | 7/2022 |
| CN | 217526213 | U | 10/2022 |
| CN | 115645769 | A | 1/2023 |
| EP | 2320397 | B1 | 5/2012 |
| EP | 2 982 416 | A1 | 2/2016 |
| EP | 2373384 | B1 | 10/2018 |
| GB | 2248884 | A | 4/1992 |
| JP | H06-343709 | A | 12/1994 |
| JP | H08-124064 | A | 5/1996 |
| JP | 3397382 | B2 | 4/2003 |
| JP | 2004-298554 | A | 10/2004 |
| JP | 2005291634 | A | 10/2005 |
| JP | 5117700 | B2 | 1/2013 |
| JP | 5654124 | B2 | 1/2015 |
| JP | 5719010 | B2 | 5/2015 |
| JP | 6189404 | B2 | 8/2017 |
| JP | 6321134 | B2 | 5/2018 |
| JP | 2021186616 | A | 12/2021 |
| JP | 7109988 | B2 | 8/2022 |
| KR | 20050097400 | A | 10/2005 |
| KR | 100880023 | B1 | 2/2009 |
| KR | 10-2010-0012689 | A | 2/2010 |
| KR | 100945260 | B1 | 3/2010 |
| KR | 10-2010-0115024 | A | 10/2010 |
| KR | 20110078600 | A | 7/2011 |
| KR | 20110002589 | U | 11/2011 |
| KR | 101088547 | B1 | 12/2011 |
| KR | 101089513 | B1 | 12/2011 |
| KR | 101208662 | B1 | 12/2012 |
| KR | 20130017610 | A | 8/2013 |
| KR | 101722045 | B1 | 3/2017 |
| KR | 101747360 | B1 | 6/2017 |
| KR | 101762550 | B1 | 7/2017 |
| KR | 101790694 | B1 | 11/2017 |
| KR | 20170138810 | A | 12/2017 |
| KR | 101815533 81 | | 1/2018 |
| KR | 101841954 | B1 | 3/2018 |
| KR | 101845263 | B1 | 4/2018 |
| KR | 101840682 | B1 | 5/2018 |
| KR | 101845264 | B1 | 5/2018 |
| KR | 101859878 | B1 | 5/2018 |
| KR | 101859955 | B1 | 5/2018 |
| KR | 101887164 | B1 | 9/2018 |
| KR | 101902976 | B1 | 10/2018 |
| KR | 10-2019-0043669 | A | 4/2019 |
| KR | 20180001140 | U | 6/2019 |
| KR | 101996949 | B1 | 7/2019 |
| KR | 102008625 | B1 | 8/2019 |
| KR | 101994222 | B1 | 9/2019 |
| KR | 102035835 | B1 | 10/2019 |
| KR | 10-2019-0131158 | A | 11/2019 |
| KR | 102050539 | B1 | 12/2019 |
| KR | 10-2020-0027390 | A | 3/2020 |
| KR | 102169547 | B1 | 10/2020 |
| KR | 102263178 | B1 | 6/2021 |
| KR | 102277919 | B1 | 7/2021 |
| KR | 102300167 | B1 | 9/2021 |
| KR | 102355909 | B1 | 2/2022 |
| NL | 2019479 | B1 | 8/2018 |
| RU | 74076 | U | 6/2008 |
| RU | 2465933 | C2 | 11/2012 |
| RU | 2717525 | C1 | 3/2020 |
| RU | 2724093 | C1 | 6/2020 |
| TW | 201425832 | A | 9/2015 |
| TW | M540352 | U | 4/2017 |
| WO | 2003031892 | A1 | 4/2003 |
| WO | 2006047246 | A2 | 5/2006 |
| WO | 2008021538 | A2 | 2/2008 |
| WO | 2010063266 | A1 | 6/2010 |
| WO | 2011034334 | A2 | 3/2011 |
| WO | 2014208865 | A1 | 12/2014 |
| WO | 2016205053 | A1 | 12/2016 |
| WO | 2018038434 | A1 | 3/2018 |
| WO | 2018176196 | A1 | 10/2018 |
| WO | 2018236571 | A1 | 12/2018 |
| WO | WO-2021/250389 | A1 | 12/2021 |
| WO | 2022066099 | A1 | 3/2022 |
| WO | 2023000087 | A1 | 1/2023 |

OTHER PUBLICATIONS

"Research and Perspectives on Fire-Fighting Systems in Tunnels under Strong Piston Wind Action", by Xiaoyi Zhao et al., Published at Construction Management, and Computers & Digitization, Published on [Jan. 31, 2023] https://www.mdpi.com/2075-5309/13/2/435.

"Wireless sensor network applications in monitoring and control of gas networks", By Sajad Balall Dehkordi et al., Published at Majlesi Journal of Telecommunication Devices , Published on [Jun. 23, 2012] https://mjtd.isfahan.iau.ir/article_695667_a4c0e30293098b0ac5497f27c4315bb9.pdf.

"Sustainability of Air Supply in Areas Immediately Dangerous to Life and Health", by Christopher W. Norris, Published at Northampton Fire Department,MA , Published in [Feb. 2008] https://apps.usfa.fema.gov/pdf/efop/efo41710.pdf.

"Sensor-based safety management", by Amin Asadzadeh et al., Published at Automation in Construction , Published on [Feb. 7, 2020] https://sci-hub.hkvisa.net/10.1016/j.autcon.2020.103128.

"Remote Monitoring and Control Using Mobile Phones", by Dr. Mikael Sjodin, Published at Newline Information , Published in [Nov. 2001] http://www.es.mdh.se/pdf_publications/413.pdf.

"Monitored Performance of an Office Buildingwith an Under-Floor Air Distribution System", by Christine E. Walker et al., Published at Fifth International Conference for Enhanced Building Operations, Pittsburgh, Pennsylvania , Published on [Oct. 13, 2005] https://oaktrust.library.tamu.edu/bitstream/handle/1969.1/5105/ESL-IC-05-10-13.pdf?sequence=4.

(56) References Cited

OTHER PUBLICATIONS

"Investigating Accessibility of Social Security System (SSS) Mobile Application: A Structural Equation Modeling Approach", Yung-Tsan Jou, Published at Sustainability 2022, Published on [Jun. 29, 2022] https://www.mdpi.com/2071-1050/14/13/7939.
"Firefighter Fatalities in the US in 2021", by Rita F. Fahy et al., Published at National Fire Protection Association (NFPA), Published in [Aug. 2022] https://www.nfpa.org/-/media/Files/News-and-Research/Fire-statistics-and-reports/Emergency-responders/osFFF.pdf.
"Reversible Longitudinal Smoke Extraction System in Enclosed Underground Parking Structure", by KongKok Haw, Published at Journal of Advanced Research in Fluid Mechanics and Thermal Sciences, Published on [Mar. 2, 2019] https://www.akademiabaru.com/submit/index.php/arfmts/article/view/2470/1450.
"Mapping Fire and Firefighter Visibility for Improving Situational Awareness", by Katherine Ann Mistick, Published at The University of Utah ProQuest Dissertations , Published in [May 2022] https://www.proquest.com/openview/089c0ac0998979da3b550b77ddee2bf1/17pq-origsile=gscholar&cbl=18750&diss=y.
"An ultra-wide band indoor personnel tracking system for emergency situations (Europcom)", by Anthony Putorti Jr. et al., Published at Radar Conference, 2008. EuRAD 2008. European, Published in [Dec. 2008] http://surl.li/hqxep.
"Threat modeling in smart firefighting systems: Aligning Mitre ATT&CK matrix and NIST security controls", Shahzaib Zahid et al., Published at Internet of Things, Published on [Mar. 21, 2023] https://tinyurl.com/msjusd3y.
"Autonomous Fire Suppression Systemfor Use in High and Low VisibilityEnvironments by Visual Servoing", by Joshua G. McNeil et al., Published at Fire Technology 2016, Published on [ Jan. 7, 2016] https://sci-hub.hkvisa.net/10.1007/s10694-016-0564-8.
"Breathing Limited Air Situational Training Masks (BlastMask) Versus SelfContained Breathing Apparatus (SCBA) for Firefighters: A Pilot Study", by Thomas L. Andre et al., Published at International journal of exercise science, Published in [2019] https://digitalcommons.wku.edu/cgi/viewcontent.cgi?article=2498&context=ijes.
"Internet of Things technology for fire monitoring system", by S.R.Vijayalakshmi et al., Published at International Research Journal of Engineering and Technology (IRJET), Published on [Jun. 6, 2017] https://www.irjet.net/archives/V4/16/IRJET-V4I6418.pdf.
"Firefighter Safety Using IoT", by Caroline Jebakumari S et al., Published at Recent Trends in Intensive Computing, Published in [Dec. 2021] https://www.researchgate.net/publication/356753949_Firefighter_Safety_Using_IoT/fulltext/61aa2f9e50e22929cd4342f7/Firefighter-Safety-Using-IoT.pdf.
"A smart fire detection system using IoT technology with automatic water sprinkler", by Hamood Alqourabah et al., Published at International Journal of Electrical and Computer Engineering (UJECE), Published on [ Mar. 5, 2021] https://pdfs.semanticscholar.org/f3e7/a7c0cf2d448be592421045033506e845e6c2.pdf.
"Route Planning for Fire Rescue Operations in Long-Term Care Facilities Using Ontology and Building Information Models", by Caroline Jebakumari S et al., Published at Building Information Modelling, Semantic Web and Internet-of-Things for Smart Cities, Published on [Jul. 21, 2022] https://www.mdpi.com/2075-5309/12/7/1060?type=check_update&version=2.
International Search Report and Written Opinion for Appl. Ser. No. PCT/IB2024/050603 dated Apr. 24, 2024 (10 pages).
International Search Report and Written Opinion issued in connection with PCT/US2023/014763 dated Jun. 21, 2023 (8 pages).
International Search Report and Written Opinion issued in connection with PCT/US2023/014764 dated Jun. 23, 2023 (9 pages).
International Search Report and Written Opinion issued in connection with PCT/US2023/014765 dated Jun. 27, 2023 (10 pages).
International Search Report and Written Opinion issued in connection with PCT/US2023/017653 dated Jul. 24, 2023 (9 pages).
International Search Report and Written Opinion issued in connection with PCT/US2023/017656 dated Jul. 19, 2023 (10 pages).
International Search Report and Written Opinion issued in connection with PCT/US2023/017803 dated Jul. 24, 2023 (8 pages).
International Search Report and Written Opinion issued in connection with PCT/US2023/018401 dated Jul. 27, 2023 (10 pages).
International Search Report and Written Opinion issued in connection with PCT/US2023/019880 dated Aug. 2, 2023 (8 pages).
International Search Report and Written Opinion issued in connection with PCT/US2023/022222 dated Aug. 24, 2023 (11 pages).
International Search Report and Written Opinion issued in connection with PCT/US2023/022223 dated Sep. 4, 2023 (7 pages).
International Search Report and Written Opinion issued in connection with PCT/US2023/024766 dated Oct. 4, 2023 (7 pages).
International Search Report and Written Opinion issued in connection with PCT/US2023/025646 dated Oct. 11, 2023 (10 pages).
International Search Report and Written Opinion issued in connection with PCT/US2023/025647 dated Oct. 4, 2023 (10 pages).
International Search Report and Written Opinion issued in connection with PCT/US2023/026172 dated Oct. 31, 2023 (9 pages).
International Search Report and Written Opinion issued in connection with PCT/US2023/026174 dated Oct. 20, 2023 (7 pages).
International Search Report and Written Opinion issued in connection with PCT/US2023/026176 dated Oct. 17, 2023 (7 pages).
International Search Report and Written Opinion issued in connection with PCT/US2023/026425 dated Oct. 17, 2023 (12 pages).
International Search Report and Written Opinion issued in connection with PCT/US2023/026428 dated Oct. 17, 2023 (8 pages).
International Search Report and Written Opinion issued in connection with PCT/US2023/026466 dated Nov. 1, 2023 (8 pages).
"Influence of Internal Gas Pipelines Built into the Structure on the Safety of Residents and Energy Eficiency Factors of the Buildings", Published at Latvian Journal of Physics and Technical Sciences, Published on [Oct. 2022] http://surl.li/fdzun.
"Indoor air quality in green buildings: A case-study in a residential high-rise building in the northeastern United States". Published at Journal of Environmental Science and Health, Published on [Feb. 2015] http://surl.li/fdzxk.
"Indoor Air-Quality Data-Monitoring System: Long-Term Monitoring Benefits", Published at MDIP, Published on [Sep. 25, 2019] https://www.mdpi.com/1424-8220/19/19/4157.
"A review of air filtration technologies for sustainable and healthy building ventilation", Published at Sustainable Cities and Society, Published on [Jul. 2017] https://core.ac.uk/download/pdf/84587706.pdf.
"A novel constant-air-volume range hood for high-rise residential buildings with 2 central shaft", Published at Energy and Buildings, Published on [May 2021] http://surl.li/feadf.
"Thermodynamic performance evaluation of HFC refrigerants for the chiller system simulated by hot gas bypass cycle", Published at ZANCO Journal of Pure and Applied Sciences, Published on [Dec. 28, 2017] http://surl.li/feadr.
"An Automatic and Accurate Localization System for Firefighters", Published at Third International Conference on Internet-of-Things Design and Implementation (IoTDI), Published on [May 28, 2018] https://www.cs.virginia.edu/~stankovic/psfiles/breadcrumb_localization.pdf.
"Fire Safety", Published at Atomic Energy Regulatory Board India, Published on [May 2019] https://aerb.gov.in/images/PDF/fire.pdf.
"Fire Service Features of Buildings and Fire Protection Systems", Published at Occupational Safety and Health Administration (OSHA), Published on [Sep. 8, 2014] https://www.osha.gov/sites/default/files/publications/OSHA3256.pdf.
"A comprehensive review on indoor air quality monitoring systems for enhanced public health", Published at Sustainable Environment Research, Published on [Dec. 2020] https://sustainenvironres.biomedcentral.com/counter/pdf/10.1186/s42834-020-0047-y.pdf.
"Review of research on air-conditioning systems and indoor air quality control for human health", Published at International Journal of Refrigeration, Published on [Jan. 2009] https://sci-hub.hkvisa.net/10.1016/j.jrefrig.2008.05.004.
"A review of the performance of different ventilation and airflow distribution systems in buildings", Published at Building and Environment, Published on [Dec. 18, 2013] https://www.academia.edu/

(56) References Cited

OTHER PUBLICATIONS

27228820/A_review_of_the_performance_of_different_ventilation_and_airflow_distribution_systems_in_buildings.
"Real-time sensors for indoor air monitoring and challenges ahead in deploying them to urban buildings", Published at Science of The Total Environment , Published on [Apr. 2016] https://eprints.ncl.ac.uk/file_store/production/223286/749E8E7D-D1EF-4056-BCDD-F48812167CB1.pdf.
"Indoor air quality and energy management through real-time sensing in commercial buildings", Published at Energy and Buildings, Published on [Jan. 2016] https://eprints.qut.edu.au/220977/1/93777.pdf.
"Compressors and Compressed Air Systems", Published at Continuing Education and Development, Found on [Mar. 2023] https://www.cedengineering.com/userfiles/Compressors%20and%20Compressed%20Air%20Systems%20R1.pdf.
"HVAC System", Published at Energy Conservation Building Code (ECBC) Tip Sheet, Published on [Jun. 2009] https://www.keralaenergy.gov.in/files/HVAC_System_Tip_Sheet.pdf.
"Air distribution of oxygen supply through guardrail slot diffusers in high-altitude hypoxic areas", Published at Building and Environment, Published on [Apr. 2020] https://rb.gy/9ktde6.
"Air Quality Control in Mine Refuge Chamber with Ventilation through Pressure Air Pipeline", Published at Process Safety and Environmental Protection, Published on [Dec. 2019] https://uhra.herts.ac.uk/bitstream/handle/2299/23249/Manuscript.pdf;jsessionid=6F0E7E29FB3FF03D59759181BA6A6161?sequence=1.
"Rescue Air for Firefighters", Published at Fire Engineering. Published on [Sep. 8, 2014] https://rescueair.com/wp-content/uploads/2020/03/rescue-air-for-firefighters.whitepaperpdf.render.pdf.
"The Case for Interior High-Rise Breathing Air Systems ", Published at Fire Engineering, Published on [Apr. 2012] https://rescueair.com/wp-content/uploads/2014/05/Rush-Article.pdf.
"RF Based Advance Smart Fire Safety System for Industries and Shopping Malls", Published at international Journal of Science and Research (IJSR), Published on [Dec. 2018] https://www.ijsr.net/archive/v7i12/ART20193898.pdf.
"Design and Implementation of Car Fire Detection and Automatic Car Door Opening Using IOT". Published at International Journal of Advances in Engineering and Management (IJAEM), Published on [ Jul. 7, 2022] https://ijaem.net/issue_dcp/Design%20and%20Implementation%20of%20Car%20Fire%20Detection%20and%20Automatic%20Car%20Door%20Opening%20Using%20lot.pdf.
"Machine Vision Based Fire Detection Techniques: A Survey", Published at Springer Nature, Published on [Nov. 27, 2020] https://sci-hub.hkvisa.net/10.1007/s10694-020-01064-z.
"An Analysis of Firefighter Breathing Air Replenishment Systems", Published al Fire Protection Research Foundation, Published o[Apr. 2021] https://www.nfpa.org/-/media/Files/News-and-Research/Fire-statistics-and-reports/Emergency-responders/RFFAnalysisOfFFBARS.pdf.
"Fire Detection Systems in Wireless Sensor Networks", Published at World Conference on Technology, Innovation and Entrepreneurship, Published on [Jul. 3, 2015] https://www.sciencedirect.com/science/article/pil/S1877042815038872.
"Fire Safety System Building", Published al IOP Conference Series: Materials Science and Engineering, Published on [Nov. 2019] https://www.researchgate.net/publication/337402246_Fire_Safety_System_Building/fulltext/5dd573ae299bf11ec866bf2c/Fire-Safety-System-Building.pdf.
"SmartFire: Intelligent Platform for Monitoring Fire Extinguishers and Their Building Environment", Published at MOPI, Published on [May 25, 2019] https://www.mdpi.com/1424-8220/19/10/2390.
"A Smart Fire Detection System using IoT Technology With Automatic Water Sprinkler", Published at International Journal of Electrical and Computer Engineering (IJECE), Published on [Oct. 7, 2020] http://surl.li/esuhn.
"Situational Awareness for first responders:Evaluation of the BIMS field trial", Published at IEEE Xplore, Published on [Dec. 9, 2009] http://surl.li/esuid.
"Fire Safety in Buildings", Published at Journal of Civil & Environmental Engineering, Published on [Jan. 2017] https://www.researchgate.net/profile/Noah-Akhimien/publication/328075851_Fire_Safety_in_Buildings/links/5bb62101299bf1049b6f57d7/Fire-Safety-in-Buildings.pdf.
"Ignis: Fire Detection and Mitigation System", Published at International Research Journal of Engineering and Technology (IRJET) , Published on [Jun. 6, 2021 ] https://www.irjet.net/archives/V8/16/IRJET-V816493.pdf.
"An Intelligent Fire Detection and Mitigation System Safe from Fire (SFF)s", Published at International Journal of Computer Applications, Published on [Jan. 2016] https://www.ijcaonline.org/research/volume133/number6/mobin-2016-ijca-907858.pdf.
"Smart Fire Alert System Using IOT", Published at International Research Journal of Modernization in Engineering Technology and Science, Published on [Mar. 3, 2022 ] https://www.irjmets.com/uploadedfiles/paper/issue_3_march_2022/20213/final/fin_irjmets1648303966.pdf.
"Johnson Controls Acquires Rescue Air Systems to Enhance Fire Suppression Portfolio", Published at TheBigRedGuide, Published on [Oct. 6, 2022] https://www.thebigredguide.com/docs/opdf/news/johnson-controls-acquires-rescue-air-systems-enhance-fire-suppression-portfolio-co-5246-ga-co-1665048943-ga.1665049545.pdf.
"5.07 Air Replenishment Systems (2019)", Published at San Francisco Fire Department Bureau of Fire Prevention & Investigation, Found Online on [Feb. 8, 2014] https://sf-fire.org/media/1220/download?inline.
"Summary of Compressed Air Samples from Firefighter Air Replenishment Systems (FARS)", Published at Firefighter Air Coalition, Published on [May 15, 2020] https://aircoalition.org/wp-content/uploads/2021/03/Trace-Analytics-FARS-Air-Quality-Report.pdf.
"Firefighter Air Replenishment Systems (FARS) Air Quality Fact Sheet ", Published at Firefighter Air Coalition, Publish Online on [Feb. 8, 2014] https://aircoalition.org/wp-content/uploads/2021/03/FAC-FARS-Air-Quality-White-Paper.pdf.
"Technical Brief on System Controls for Industrial Compressed Air Systems", Published at Compressed Air and Gas Institute, Found Online on [Feb. 15, 2022] https://www.cagi.org/assets/documents/pdfs/SystemControlsTechnicalBrief.pdf?updated=1657712699.
"Case Study—System Controls", Published at Compressed Air and Gas Institute, Found Online on [Feb. 15, 2022] https://www.cagi.org/assets/documents/pdfs/SystemControlsCaseStudy.pdf?updated=1657712699.
"Technical Brief—Heat Recovery from Industrial Compressed Air Systems", Published at Compressed Air and Gas Institute, Found Online on [Feb. 15, 2022] https://www.cagi.org/assets/documents/pdfs/HeatRecoveryTechnicalBrief.pdf?updated=1657712699.
"Technical Brief on Distribution Piping Network", Published at Compressed Air and Gas Institute, Found Online on [Feb. 15, 2022] https://www.cagi.org/assets/documents/pdfs/DistributionPipingNetworkTechnicalBrief.pdf?updated=1657712699.
"Technical Brief on Pressure Drop", Published at Compressed Air and Gas Institute, Found Online on [Feb. 15, 2022] https://www.cagi.org/assets/documents/pdfs/PressureDropTechnicalBrief.pdf?updated=1657712700.
"Technical Brief on Variable Speed Drive", Published at Compressed Air and Gas Institute, Found Online on [Feb. 15, 2022] https://www.cagi.org/assets/documents/pdfs/VariableSpeed-DriveTechnicalBrief.pdf?updated=1657712699.
"Compressor Room Advantages with Oil-Free Centrifugal Air Compressors", Published at Compressed Air and Gas Institute, Found Online on [Feb. 15, 2022] https://www.cagi.org/pdf/downloads/compressor-room-advantages-with-oil-free-centrifugal-air-compressors.
"Preparing Reciprocating Air Compressors for Winter", Published at Compressed Air and Gas Institute, Found Online on [Feb. 15, 2022] https://www.cagi.org/pdf/downloads/preparing-reciprocating-air-compressors-for-winter.
"Nitrogen Characteristics and Benefits of On-Site Generation", Published at Compressed Air and Gas Institute, Found Online on [Feb. 15, 2022] https://www.cagi.org/pdf/downloads/19-nitrogen-characteristics-and-benefits-of-on-site-generation.

(56) References Cited

OTHER PUBLICATIONS

"Key Considerations for installing Centrifugal Air Compressors", Published at Compressed Air and Gas Institute, Found Online on [Feb. 15, 2022] https://www.cagi.org/pdf/downloads/20-key-considerations-for-installing-centrifugal-air-compressors.

"Compressed Air & Gas Handbook", Published at Compressed Air and Gas Institute, Found Online on [Feb. 15, 2022] https://www.cagi.org/handbook-pdfs/handbook-chapter-1.

"Climate Change: Atmospheric Carbon Dioxide", Published at NOAA Climate, Publish on [Jun. 23, 2022] https://www.climate.gov/news-features/understanding-climate/climate-change-atmospheric-carbon-dioxide.

"Fire Hazard in Buildings: Review,Assessment and Strategies for Improving Fire Safety", Published at Emerald Insight, Publish on [Dec. 28, 2018] https://www.emerald.com/insight/content/doi/10.1108/PRR-12-2018-0033/full/pdf?title=fire-hazard-in-buildings-review-assessment-and-strategies-for-improving-fire-safety.

"Environmental Study of Firefighters", Published at University of California, Publish on [Sep. 8, 2015] https://sci-hub.hkvisa.net/10.1093/annhyg/35.6.581.

"Summary of human responses to ventilation", Published at California Digital Library University of Clifiornia, Publish on [Jun. 1, 2004] https://escholarship.org/content/qt64k2p4dc/qt64k2p4dc.pdf.

"Fixed Fire Protection Systems in Tunnels:Issues and Directions", Published at Fire Technology, Publish on [Sep. 30, 2010] https://sci-hub.hkvisa.net/10.1007/s10694-011-0220-2.

"Comparison of Underfloor Vs. Overhead Air Distribution Systems in an Office Building", Published at Department of Architecture, Waseda University. Found Online on [Feb. 15, 2022] https://www.airfixture.com/wp-content/uploads/2016/07/ASHRAE-Underfloor-vs-Overhead-Study.pdf.

"General Requirements in piping Design", Published at RMIT University in partnership with Informit Open, Publish on [Jul. 2021] https://search.informit.org/doi/epdf/10.3316/informit.947188479100130.

"Optimal operation of heat supply systems with piping network" Published at Department of Mechanical Engineering, Osaka Prefecture University, Publish on [Oct. 14, 2016] https://sci-hub.hkvisa.net/10.1016/j.energy.2017.03.146.

"Compressed Air Piping Network Inspection and Documentation for PAROC", Published at Turku University of Applied Sciences, Found Online on [Feb. 15, 2022] https://www.theseus.fi/bitstream/handle/10024/122415/Myllyniemi_Jani.pdf?sequence=1.

"Natural Gas Pipeline Technology Overview", Publish at Argonne National Laboratory, Publish on [Nov. 2007] https://publications.anl.gov/anlpubs/2008/02/61034.pdf.

"Improving the indoor air quality using the individual air supply system", Publish at Int. J. Environ. Sci. Technol., Publish on [Jul. 24. 2017] https://link.springer.com/content/pdf/10.1007/s13762-017-1432-x.pdf?pdf=button.

"Analytical Modeling of Fire Smoke Spread in High-rise Buildings", Published at Concordia Univeristy Montreal, Quebec, Canada Publish on [Sep. 2016] https://core.ac.uk/download/pdf/211519293.pdf.

* cited by examiner

METHOD AND SYSTEM OF SENSOR-BASED SMART UNLOCKING OF A FIREFIGHTER AIR REPLENISHMENT SYSTEM

CLAIM OF PRIORITY

This application is a conversion application of, and claims priority to, U.S. Provisional Patent Application No. 63/356,996 titled CLOUD-BASED FIREFIGHTING AIR REPLENISHMENT MONITORING SYSTEM, SENSORS AND METHODS filed on Jun. 29, 2022, and U.S. Provisional Patent Application No. 63/357,145 titled METHOD AND SYSTEM OF SENSOR-BASED SMART UNLOCKING OF A FIREFIGHTER AIR REPLENISHMENT SYSTEM filed on Jun. 30, 2022. The contents of each of the aforementioned applications are incorporated herein by reference in entirety thereof.

FIELD OF TECHNOLOGY

This disclosure relates generally to firefighting systems and, more particularly, to a method and system of sensor-based smart unlocking of a firefighter air replenishment system.

BACKGROUND

An emergency response team may be deployed to alleviate an emergency situation and/or rescue people in an occupiable structure (e.g., a building such as a mid and/or high-rise building, a large horizontal structure such as a big box retail store, a warehouse and/or a manufacturing plant, a tunnel, a wind turbine and/or a large marine vessel) that is affected by an accident. The emergency situation and/or the accident may include but is not limited to an event such as a fire, an explosion, a chemical attack, a terror attack, a subway accident, a mine collapse, a catastrophic event and a biological agent attack. During the emergency situation, the air quality in the occupiable structure may be compromised by smoke and/or inflammatory and/or toxic air, making it difficult for an emergency responder to breathe. The emergency response team may rely on a Firefighter Air Replenishment System (FARS) installed within the occupiable structure to access reliable and safe supply of breathable air.

The emergency response team may have difficulty accessing the safe, breathable air in the FARS installed within the occupiable structure as emergency fill panels thereof may be located inside a locked closet and/or a room for protection against unauthorized access and/or tampering. In the absence of instantaneous access provisions, the emergency response team may need to forcibly open the locked closet and/or the room located inside the occupiable structure to access the breathable air from the emergency fill panels, causing delays that may endanger lives.

SUMMARY

Disclosed are a method and a system of sensor-based smart unlocking of a firefighter air replenishment system.

In one aspect, a safety system of an occupiable structure includes a breathable-air supply system to facilitate delivery of breathable air from a source of compressed air, and a fill station in a fire-rated evacuation area of the occupiable structure to supply the breathable air to an emergency personnel. The safety system also includes a smart lock associated with the breathable-air supply system to automatically unlock at one or more location(s) of the breathable-air supply system usable by the emergency personnel to access the breathable air during an emergency state of the occupiable structure, and a sensor associated with the breathable-air supply system to detect the emergency state of the occupiable structure.

The smart lock associated with the breathable-air supply system may automatically lock the one or more location(s) of the breathable-air supply system required by the emergency personnel to access the breathable air when the emergency state ends and a normal state of the occupiable structure is detected. The breathable-air supply system may be housed in an air storage sub-system appurtenant to the occupiable structure. A lock state and an unlock state of the smart lock is determined based on a sensory data of the sensor associated with the breathable-air supply system.

The one or more location(s) of the breathable-air supply system required by the emergency personnel to access the breathable air during the emergency state of the occupiable structure may include a video camera that captures a visual recording when the one or more location(s) is being accessed by anyone in the unlock state. The video camera may also record an audio communication ambient to the one or more location(s). The visual recording and/or the audio recording may be communicated to a remote fire command center, an onsite fire command center and/or a fire command room.

The breathable-air supply system may automatically transcribe the audio communication and/or the visual recording of the one or more location(s). The breathable-air supply system may automatically provide a situational awareness recommendation to the remote fire command center, the onsite fire command center and/or the fire command room using an artificial intelligence algorithm based on a regression analysis of the sensory data.

The sensor may include a carbon monoxide sensor, a carbon dioxide sensor, an oxygen level sensor, a nitrogen level sensor, a hydrocarbon sensor, a moisture sensor, and/or a pressure sensor. The carbon monoxide sensor may trigger the emergency state when a level of ambient carbon monoxide exceeds a first predetermined threshold value (e.g., 5 parts per million (ppm), 10 ppm). The carbon dioxide sensor may trigger the emergency state when a level of ambient carbon dioxide exceeds a second predetermined threshold value (e.g., 1000 ppm, 1200 ppm). The oxygen level sensor may trigger the emergency state when the ambient oxygen level falls outside a predetermined threshold range (e.g., between 19.5% and 23.5%) of values.

The nitrogen level sensor may trigger the emergency state when a level of nitrogen falls below a third predetermined threshold value (e.g., 75%) and/or rises above a fourth predetermined threshold value (e.g., 81%). The hydrocarbon sensor may trigger the emergency state when a condensed hydrocarbon content exceeds a fifth predetermined threshold value (e.g., 5 milligrams per cubic meter of air). The moisture sensor may trigger the emergency state when moisture concentration exceeds a sixth predetermined threshold value (e.g., 24 ppm by volume). The pressure sensor may trigger the emergency state when pressure falls below a seventh predetermined threshold value (e.g., 90 percent of the maintenance pressure specified in a fire code).

The one or more location(s) of the breathable-air supply system may include an exterior mobile air connection panel, an air monitoring closet, an air monitoring room, an air storage closet, an air storage room, a fire command center, a fire command room, a fire alarm panel, a computing device executing a software application thereon, a fill station of the occupiable structure and/or a temporarily established fill station connected to a compressed air source during the emergency state. The smart lock associated with the breathable-air supply system automatically unlocks each location of the breathable-air supply system usable during the emergency state of the occupiable structure. The fire-rated evacuation area of the occupiable structure may be a stairwell. The sensor associated with the breathable-air supply system may include an array of sensors.

In another aspect, a method of a safety system of an occupiable structure includes facilitating a breathable-air supply system to deliver breathable air from a source of compressed air, and supplying the breathable air to an emergency personnel through a fill station in a fire-rated evacuation area of the occupiable structure. The method also includes automatically unlocking a smart lock associated with the breathable-air supply system to permit entry to one or more location(s) of the breathable-air supply system usable by the emergency personnel to access the breathable air during an emergency state of the occupiable structure. Further, the method includes integrating a sensor within the breathable-air supply system to detect the emergency state based on a threshold level of an air quality parameter, and configuring the sensor to trigger an alert signal to automatically unlock the smart lock on the detection of the emergency state.

The method may also include automatically locking the one or more location(s) of the breathable-air supply system required by the emergency personnel to access the breathable air when the emergency state ends and a normal state of the occupiable structure is detected by the sensor, and recording, through a video camera, an audiovisual incident to communicate to a remote fire command center, an onsite fire command center and/or a fire command room through a cloud computing network, when the one or more location(s) is accessed by an unauthorized person and/or the emergency personnel in an unlock state of the smart lock.

The method may also include automatically providing, through the breathable-air supply system, a situational awareness recommendation to the remote fire command center, the onsite fire command center and/or the fire command room using an artificial intelligence algorithm based on a regression analysis of a sensory data of the sensor, and providing the sensor with a carbon monoxide sensor, a carbon dioxide sensor, an oxygen level sensor, a nitrogen level sensor, a hydrocarbon sensor, a moisture sensor and/or a pressure sensor.

The method may further include generating a trigger signal to alert the emergency personnel, the remote fire command center, the onsite fire command center and/or the fire command room based on detecting tampering of the smart lock associated with the breathable-air supply system. The one or more location(s) may include an exterior mobile air connection panel, an air monitoring closet, an air monitoring room, an air storage closet, an air storage room, a fire command center, a fire command room, a fire alarm panel, a computing device executing a software application thereon, a fill station of the occupiable structure and/or a temporarily established fill station connected to a compressed air source during the emergency state.

The smart lock associated with the breathable-air supply system may automatically unlock each location of the breathable-air supply system usable during the emergency state of the occupiable structure. The fire-rated evacuation area of the occupiable structure may be a stairwell. The sensor within the breathable-air supply system may include an array of sensors. Additionally, the method may include accessing the smart lock using a Radio Frequency Identification (RFID) system, a smart card, a key fob access, a Non-Fungible Token (NFT), a physical key, a biometric system and/or a web-based identification system.

Also, the method may include automatically triggering the emergency state using the carbon monoxide sensor when a level of ambient carbon monoxide exceeds a first predetermined threshold value (e.g., 5 parts per million (ppm), 10 ppm), automatically triggering the emergency state using the carbon dioxide sensor when a level of ambient carbon dioxide exceeds a second predetermined threshold value (e.g., 1000 ppm, 1200 ppm), and automatically triggering the emergency state using the oxygen level sensor when a level of ambient oxygen falls outside a predetermined range of values (e.g., between 19.5% and 23.5%). Additionally, the method may include automatically triggering the emergency state using the nitrogen level sensor when a level of nitrogen falls below a third predetermined threshold value (e.g., 75%) and when the level of nitrogen rises above a fourth predetermined threshold value (e.g., 81%), and automatically triggering the emergency state using the hydrocarbon sensor when a condensed hydrocarbon content exceeds a fifth predetermined threshold value (e.g., 5 milligrams per cubic meter of air).

Still further, the method may include automatically triggering the emergency state using the moisture sensor when a moisture concentration exceeds a sixth predetermined threshold value (e.g., 24 ppm by volume), and, automatically triggering the emergency state using the pressure sensor when a pressure falls below a seventh predetermined threshold value (e.g., 90 percent of the maintenance pressure specified in a fire code).

In yet another aspect, a method of a safety system of an occupiable structure includes facilitating a breathable-air supply system to deliver breathable air from a source of compressed air, and supplying the breathable air to an emergency personnel through a fill station in a fire-rated evacuation area of the occupiable structure. The method also includes automatically unlocking a smart lock associated with the breathable-air supply system to permit entry to each location of the breathable-air supply system usable by the emergency personnel to access the breathable air during an emergency state of the occupiable structure, and integrating a sensor within the breathable-air supply system to detect the emergency state based on a threshold level of an air quality parameter. Further, the method also includes configuring the sensor to trigger an alert signal to automatically unlock the smart lock on the detection of the emergency state.

Other features will be apparent from the accompanying drawings and from the detailed description that follows.

BRIEF DESCRIPTION OF THE DRAWINGS

The embodiments of this invention are illustrated by way of example and not limitation in the figures of the accompanying drawings, in which like references indicate similar elements and in which.

Figure 1:
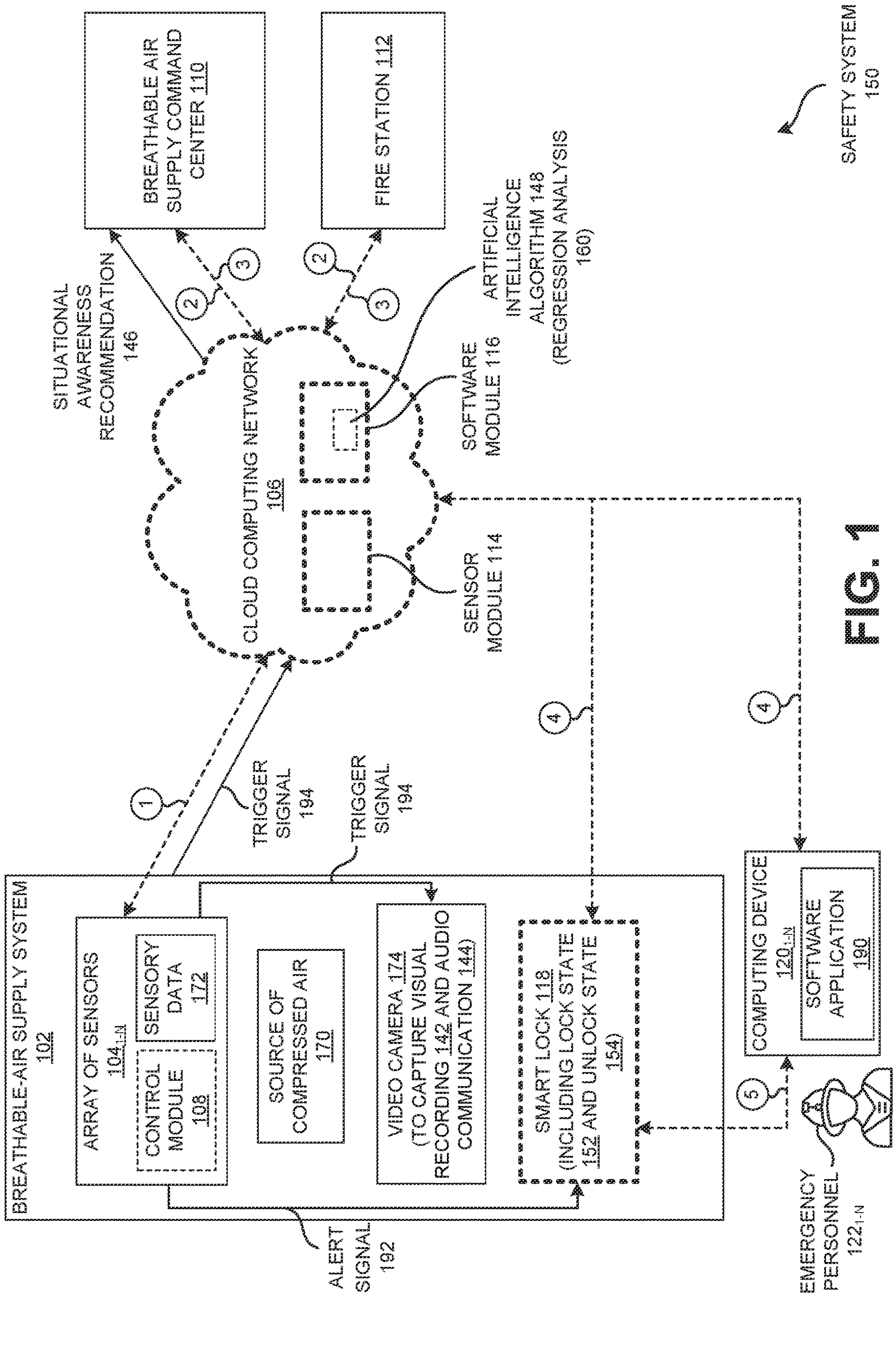
FIG. 1 is a schematic view of a safety system interpretable as a smart locking system of a breathable-air supply system, according to one embodiment.

Other features of the present embodiments will be apparent from the accompanying drawings and from the detailed description that follows.

DETAILED DESCRIPTION

Example embodiments, as described below, may be used to provide methods and/or a system of a sensor-based smart unlocking of a firefighter air replenishment system. Although the present embodiments have been described with reference to specific example embodiments, it will be evident that various modifications and changes may be made to these embodiments without departing from the broader spirit and scope of the various embodiments.

In one embodiment, a safety system 150 of a building 308 (an example occupiable structure) includes a breathable-air supply system 102, a fill station (e.g., internal air fill station 202), a smart lock 118, and an array of sensors $\mathbf{104}_{1\text{-}N}$. The breathable-air supply system 102 facilitates the delivery of breathable air from a source of compressed air 170. The fill station (e.g., internal air fill station 202) in a fire-rated evacuation area 350 (e.g., a fire-rated stairwell) of building 308 supplies breathable air to an emergency personnel $\mathbf{122}_{1\text{-}N}$. The smart lock 118 associated with the breathable-air supply system 102 automatically unlocks one or more location(s) (e.g., locations 370 such as fire-rated evacuation area 350 and others to be discussed below) of the breathable-air supply system 102 usable by the emergency personnel $\mathbf{122}_{1\text{-}N}$ to access the breathable air during an emergency state 380 of the building 308. The array of sensors $\mathbf{104}_{1\text{-}N}$ associated with the breathable-air supply system 102 is configured to detect the emergency state 380 of the building 308.

The smart lock 118 may automatically lock the one or more location(s) 370 of the breathable-air supply system 102 when the emergency state 380 ends and a normal state 390 of the building 308 is detected. The breathable-air supply system 102 may be housed in an air storage sub-system (e.g., air storage system 206) appurtenant to the building 308. The smart lock 118 associated with the breathable-air supply system 102 may include a lock state 152 and an unlock state 154. The lock state 152 and the unlock state 154 of the smart lock 118 may be determined based on a sensory data 172 (e.g., shown as part of array of sensors $\mathbf{104}_{1\text{-}N}$) of the array of sensors $\mathbf{104}_{1\text{-}N}$ within the breathable-air supply system 102.

The breathable-air supply system 102 may include a video camera 174 in the one or more location(s) 370 required by the emergency personnel $\mathbf{122}_{1\text{-}N}$ to access the breathable air during the emergency state 380 of the building 308. The video camera 174 may capture a visual recording 142 when the one or more location(s) 370 is accessed by anyone in the unlock state 154. The video camera 174 may further record audio communication 144 ambient to the one or more location(s) 370. The visual recording 142 and/or the audio communication 144 may be communicated to a breathable air supply command center 110 (e.g., a remote fire command center, an onsite fire command center) and/or a fire command room (e.g., a fire control room 222). In addition, the breathable-air supply system 102 may automatically transcribe the audio communication 144 and/or the visual recording 142 of the one or more location(s) 370.

The breathable-air supply system 102 may automatically provide a situational awareness recommendation 146 to the a breathable air supply command center 110 and/or the fire command room. The situational awareness recommendation 146 may be provided by using an artificial intelligence algorithm 148 (e.g., executing as part of software module 116 of a cloud computing network 106) based on a regression analysis 160 of the sensory data 172.

The array of sensors $\mathbf{104}_{1\text{-}N}$ may include a carbon monoxide sensor 416, a carbon dioxide sensor 418, an oxygen level sensor 420, a nitrogen level sensor 422, a hydrocarbon sensor 424, a moisture sensor 426 and/or a pressure sensor 428. The carbon monoxide sensor 416 may trigger the emergency state 380 when a level of ambient carbon monoxide exceeds a first predetermined threshold value (e.g., 5 parts per million (ppm), 10 ppm). The carbon dioxide sensor 418 may trigger the emergency state 380 when a level of ambient carbon dioxide exceeds a second predetermined threshold value (e.g., 1000 ppm, 1200 ppm). The oxygen level sensor 420 may trigger the emergency state 380 when an ambient oxygen level falls outside a predetermined range of values (e.g., between 19.5% and 23.5%). The nitrogen level sensor 422 may trigger the emergency state 380 when a level of nitrogen falls below a third predetermined threshold value (e.g., 75%) and above a fourth predetermined threshold value (e.g., 81%). The hydrocarbon sensor 424 may trigger the emergency state 380 when a condensed hydrocarbon content exceeds a fifth predetermined threshold value (e.g., 5 milligrams per cubic meter of air). The moisture sensor 426 may trigger the emergency state 380 when moisture concentration exceeds a sixth predetermined threshold value (e.g., 24 ppm by volume). The pressure sensor 428 may trigger the emergency state 380 when pressure falls below a seventh predetermined threshold value (e.g., 90 percent of the maintenance pressure specified in a fire code).

The one or more location(s) 370 may include an exterior mobile air connection panel 214, an air monitoring closet (e.g., air monitoring system 204), an air monitoring room, an air storage closet (e.g., air storage system 206), an air storage room, the fire command center, the fire command room, a fire alarm panel, a software application 190 (e.g., fire safety application 502) of a computing device $\mathbf{120}_{1\text{-}N}$, a fill station (e.g., internal air fill station 202) of the building 308 and/or a temporarily established fill station connected to a compressed air source (e.g., source of compressed air 170) during the emergency state.

The smart lock 118 associated with the breathable-air supply system 102 may automatically unlock each location 370 of the breathable-air supply system 102 usable during the emergency state 380 of the building 308. The fire-rated evacuation area 350 of the building 308 may be a stairwell. The array of sensors $\mathbf{104}_{1\text{-}N}$ may, in some embodiments, be understood as a standalone sensor with one or more capabilities discussed herein.

In another embodiment, a method of a safety system 150 of a building 308 includes facilitating the breathable-air supply system 102 to deliver breathable air from a source of compressed air 170, and supplying breathable air to an emergency personnel $\mathbf{122}_{1\text{-}N}$ through a fill station (e.g., internal air fill station 202) in a fire-rated evacuation area 350 (e.g., a stairwell) of the building 308. The method also includes automatically unlocking smart lock 118 associated with the breathable-air supply system 102 usable by the emergency personnel $122_{1-N}$ during an emergency state 380 of the building 308. The automatic unlocking of the smart lock 118 permits entry to one or more location(s) 370 of the breathable-air supply system 102 to access the breathable air during the emergency state 380 of the building 308. In addition, the method includes integrating an array of sensors $104_{1-N}$ within the breathable-air supply system 102 to detect the emergency state 380 based on a threshold level (e.g., a first predetermined threshold value, a second predetermined threshold value and so on) of an air quality parameter (e.g., the parameters discussed herein with threshold levels), and configuring the array of sensors $104_{1-N}$ to trigger an alert signal 192 to automatically unlock the smart lock 118 on detection of the emergency state 380.

The method of the safety system 150 of the building 308 may automatically record an audiovisual incident (e.g., visual recording 142 and/or audio communication 144) using a video camera 174 when the one or more location(s) 370 of the breathable-air supply system 102 is accessed by the emergency personnel $122_{1-N}$ in an unlock state 154 of the smart lock 118. The method may involve communicating the audiovisual incident to breathable air supply command center 110 (e.g., a remote fire command center, an onsite fire command center) and/or a fire command room through a cloud computing network 106.

The smart lock 118 associated with the breathable-air supply system 102 may be accessed using a Radio Frequency Identification (RFID) system, a smart card, a key fob access, a Non-Fungible Token (NFT), a physical key and/or a web-based identification system. The method may involve generate a trigger signal 194 (e.g., based on array of sensors $104_{1-N}$) to alert the emergency personnel $122_{1-N}$, breathable air supply command center 110 and/or the fire command room based on a detection (e.g., using array of sensors $104_{1-N}$) of tampering of the smart lock 118 associated with the breathable-air supply system 102.

FIG. 1 shows a safety system 150 interpretable as a smart locking system of a breathable-air supply system 102 involving remote operation of a smart lock 118 through a cloud computing network 106 (e.g., of a breathable-air supply command center 110), according to one or more embodiments. The breathable-air supply system 102 may be an interconnected network of components designed to provide for a continuous, unobstructed and reliable source of breathing air to an emergency responder (e.g., a firefighter, emergency personnel $122_{1-N}$). The breathable-air supply system 102 may be located in a central part of building 308 (an example occupiable structure) hosting various components thereof. The breathable-air supply system 102 may include a network of air standpipes 302 embedded in a fire-rated channel to supply breathable air.

Different components of the breathable-air supply system 102 may be communicatively coupled to the breathable-air supply command center 110 and the fire station 112 through the cloud-computing network 106 to enable real-time monitoring thereof. The breathable-air supply system 102 may include an array of sensors $104_{1-N}$ to collect real-time sensory data 172 for continuous monitoring of components thereof. The breathable-air supply system 102 may be installed in a fire-rated room (e.g., chamber) of the building 308. The air standpipes 302 installed within building 308 may be connected to the breathable-air supply system 102 to deliver a safe, instant and constant supply of air replenishment to the emergency responders (e.g., emergency personnel $122_{1-N}$, firefighters). The breathable-air supply system 102 may function as a primary command center (e.g., fire control room 222 in an emergency situation) for the specific building 308 in which the particular breathable-air supply system 102 unit is installed, according to one embodiment.

The array of sensors $104_{1-N}$ may be a collection of sensors (e.g., device, module, machine, and/or subsystem) deployed in a specific geometric pattern for collecting and/or processing electrical, electromagnetic and/or acoustic signals within the breathable-air supply system 102. Other forms of signals are within the scope of the exemplary embodiments discussed herein. The array of sensors $104_{1-N}$ may also be interpreted as a standalone sensor having one or more capabilities discussed herein in some embodiments. The array of sensors $104_{1-N}$ may detect events and/or changes in an environment thereof and send the information to various components of the breathable-air supply system 102 through cloud computing network 106. The array of sensors $104_{1-N}$ may be configured to automatically measure one or more physical inputs from the environment thereof and convert said data into sensory data 172 that can be interpreted by the cloud computing network 106.

The cloud computing network 106 may be a computer network that provides network interconnectivity between cloud-based and/or cloud-enabled applications, services, and/or solutions within the network to monitor and manage the maintenance of air replenishment and/or air quality parameters in the breathable-air supply system 102. The cloud-computing network 106 may store the digital and/or sensory data 172 from the array of sensors $104_{1-N}$ to analyze the functionalities of the components in the breathable-air supply system 102, according to one embodiment. The control module 108 may be a series of standardized units configured to regulate the array of sensors $104_{1-N}$ and/or various components in the breathable-air supply system 102 based on sensory data 172 collected by the array of sensors $104_{1-N}$, according to one embodiment.

The breathable-air supply command center 110 (e.g., onsite fire command center, remote fire command center, fire control room 222 (example fire command room)) may be a focal point for generation, dispatch and management of monitoring and maintenance of air replenishment in the breathable-air supply system 102. The breathable-air supply command center 110 may optimally manage the resources in the cloud-computing network 106 to detect and/or rectify anomalies (e.g., air contamination, particulates, pollutants, etc.) found in the breathable-air supply system 102 by the array of sensors $104_{1-N}$, according to one embodiment.

The fire station 112 may be the designated housing for emergency responders (and emergency personnel $122_{1-N}$) and firefighting apparatuses thereof to enable the fastest response possible to breathable-air supply system 102 customers (e.g., fire safety personnel including emergency personnel $122_{1-N}$, rescuers, etc.) and emergency personnel $122_{1-N}$. The computing device $120_{1-N}$ may be a digital electronic machine (e.g., a data processing device) communicatively coupled to the cloud computing network 106 that can be programmed to carry out an automatic sequence of arithmetic and/or logical operations (e.g., computation) to enable the emergency personnel $122_{1-N}$ to monitor and/or recalibrate the components of the breathable-air supply system 102, according to one embodiment. As shown in FIG. 1, computing device $120_{1-N}$ may execute software application 190 (e.g., fire safety application 502) thereon that may enable access to the one or more location(s) 370.

The sensor module 114 may be a series of standardized units in the cloud computing network 106 that are configured to regulate the array of sensors $104_{1-N}$ and/or various components in the breathable-air supply system 102 based on sensory data 172 collected by the array of sensors $104_{1-N}$.

The breathable-air supply command center 110, the breathable-air supply system 102, and/or the emergency personnel 122 may reconfigure the sensor module 114 to regulate the array of sensors $\mathbf{104}_{1\text{-}N}$ based on sensory data 172 during the emergency situation (e.g., emergency state 380), according to one embodiment.

Figure 2:
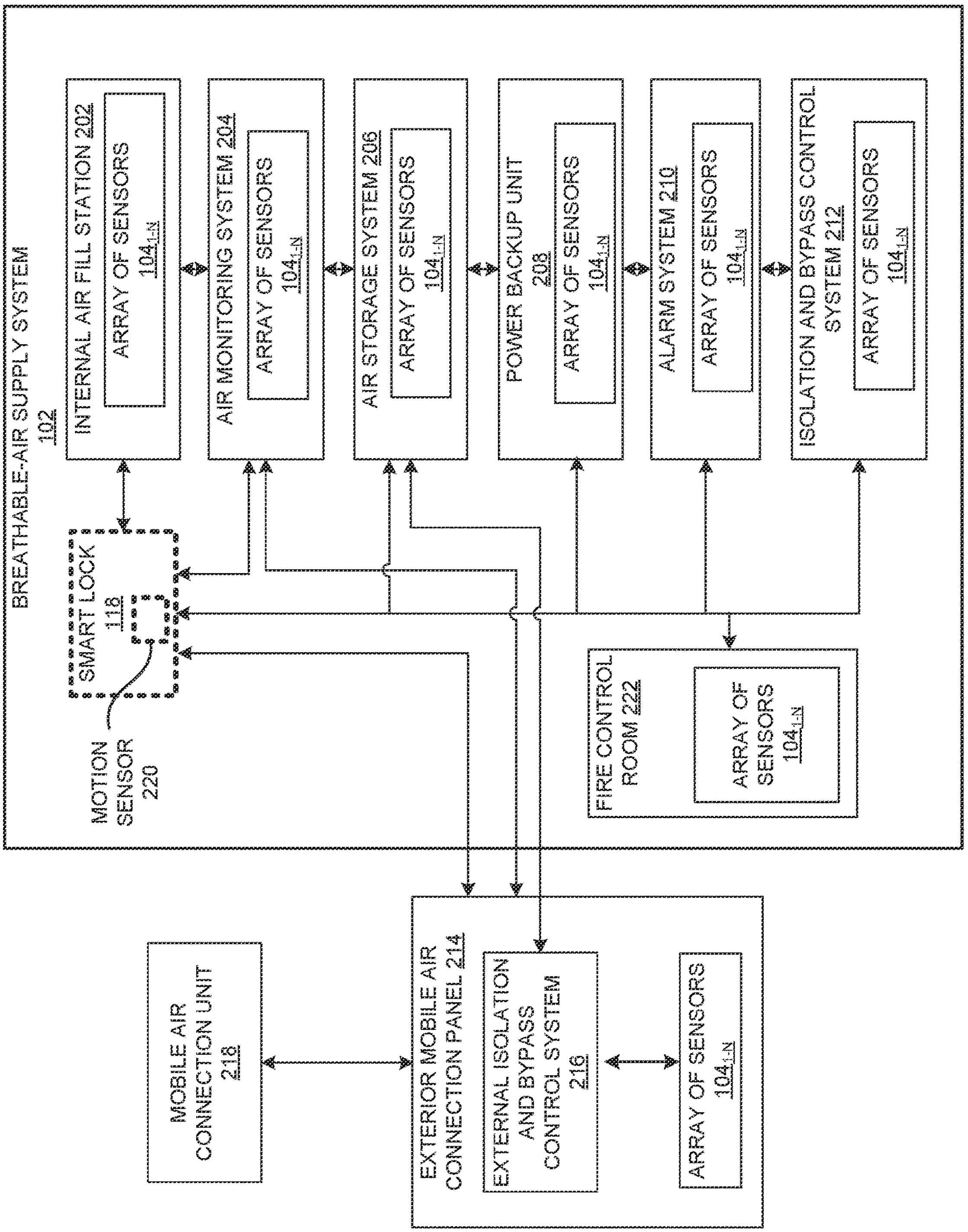
FIG. 2 is a schematic view of the safety system of FIG. 1 in more detail, according to one embodiment.

The software module 116 may be a series of instructions and/or a set of rules to be followed in problem-solving operations to automatically detect an error and/or a fault (e.g., increased temperature, variation in pressure, leakage, anomalies in the air quality parameters, etc.) in any of the components (e.g., internal air fill station 202, air monitoring system 204, air storage system 206, etc.) and/or air standpipe 302 of the breathable-air supply system 102 and generate a recommendation to rectify the error and/or fault using artificial intelligence, machine learning methods, and/or other predefined algorithms to optimally modify, maintain, and/or manage the resources of the breathable air-supply system 102. FIG. 2 shows array of sensors $\mathbf{104}_{1\text{-}N}$ as part of internal air fill station 202, air monitoring system 204, air storage system 206, a power backup unit 208 (to be discussed below), an alarm system 210 (to be discussed below), isolation and bypass control system 212, and fire control room 222 for example purposes.

The smart lock 118 of the breathable air supply system 102 may be a programmable electromechanical device to automatically secure the various units of the breathable-air supply system 102 from unauthorized access and/or tampering. The smart lock 118 may be integrated with each unit of the breathable-air supply system 102 (e.g., air monitoring system 204, internal air fill station 202, air storage system 206, isolation and bypass control system 212, power backup unit 208, alarm system 210, and an exterior mobile air connection panel 214 (to be discussed below)) to secure the units from unauthorized access, intrusion and/or tampering, according to one embodiment. In one or more embodiments the smart lock 118 may include a securing mechanism configured to automatically lock and/or unlock various units of the breathable-air supply system 102 once an instruction (e.g., triggering instructions from the array of sensors $\mathbf{104}_{1\text{-}N}$) is received thereby from the breathable-air supply command center 110 and/or an authorized user device (e.g., computing device $\mathbf{120}_{1\text{-}N}$).

In another embodiment, the smart lock 118 may be integrated with the array of sensors $\mathbf{104}_{1\text{-}N}$ to detect the emergency state 380 (e.g., one or more drops in air quality parameters) of building 308. The smart lock 118 associated with the breathable-air supply system 102 may be programmed to automatically unlock the one or more locations 370 (e.g., each location 370) of the breathable-air supply system 102 usable by the emergency personnel $\mathbf{122}_{1\text{-}N}$ to access the breathable air once the emergency state 380 of the building 308 is detected by the array of sensors $\mathbf{104}_{1\text{-}N}$.

In a further embodiment, the authorized device (e.g., computing device $\mathbf{120}_{1\text{-}N}$) may include an RFID system, a wireless protocol, a smart card, key fob access, an NFT, a physical key, biometric access, a web-based identification system, etc. The smart lock 118 may be associated with the one or more locations 370 of the breathable-air supply system 102 (e.g., internal air fill station 202, air monitoring system 204, air storage system 206, power backup unit 208, alarm system 210, isolation and bypass control system 212, exterior mobile air connection panel 214, fire control room 222, etc.) to secure the system from any intrusion therein.

The smart lock 118 may include a tamper switch (not shown; e.g., associated with the array of sensors $\mathbf{104}_{1\text{-}N}$) to automatically trigger an alert signal (e.g., alert signal 192) when the intrusion within the breathable-air supply system 102 occurs. The alert signal 192 may serve as an alarm to the emergency personnel $\mathbf{122}_{1\text{-}N}$, breathable air supply command center 110 (e.g., a remote fire command center, an onsite fire command center) and/or the fire command room (e.g., fire control room 222) indicating that tampering of the smart lock 118 has been detected using the computing device $\mathbf{120}_{1\text{-}N}$ (e.g., smart phone, tablet, etc.) and/or array of sensors $\mathbf{104}_{1\text{-}N}$ through the software application (e.g., software application 190) implementation.

In another embodiment, the smart lock 118 may be made of metallic material (e.g. 18 gauge carbon steel) to protect the breathable-air supply system 102 from intrusion and/or physical damage. The smart lock 118 may further be made of a weather-resistant and/or ultraviolet solar radiation-resistant and/or infrared solar radiation-resistant material that prevents the smart lock 118 from corrosion and/or deterioration of material due to prolonged exposure to harsh environmental and/or weather conditions. In addition, the smart lock 118 may include video camera 174 to capture a visual recording 142 and/or an audio communication 144 when the breathable-air supply system 102 is accessed by anyone in the unlock state 154, according to one embodiment.

The array of sensors $\mathbf{104}_{1\text{-}N}$ may continuously monitor parameters of the breathable-air supply system 102 such as temperature, pressure, air components, air replenishment, availability of air, air leakage, fire detection, airflow, power supply, and/or other breathable air parameters (e.g. oil mist and particulates, odor). The array of sensors $\mathbf{104}_{1\text{-}N}$ may be configured to detect the emergency state 380 of building 308 whenever a specific parameter of the breathable-air supply system 102 is above and/or below predefined threshold values (e.g., as discussed above) and/or outside predetermined range(s) of values. During the emergency state 380 of building 308, the array of sensors $\mathbf{104}_{1\text{-}N}$ may generate an electrical signal to automatically unlock the smart lock 118 of the one or more location(s) 370 of the breathable-air supply system 102 usable by the emergency personnel $\mathbf{122}_{1\text{-}N}$. The automatic unlocking of the smart lock 118 may permit entry to the one or more location(s) 370 of the breathable-air supply system 102 to access the breathable air during the emergency state 380 of building 308, according to one embodiment. The computing device $\mathbf{120}_{1\text{-}N}$ may enable emergency personnel $\mathbf{122}_{1\text{-}N}$ to monitor and/or recalibrate components of the breathable-air supply system 102 based on sensory data 172 of the array of sensors $\mathbf{104}_{1\text{-}N}$, according to one embodiment.

The emergency personnel $\mathbf{122}_{1\text{-}N}$ may be an entity/entities and/or person(s) authenticated by the breathable-air supply command center 110 to access and/or manage the resources in the breathable-air supply system 102 through the cloud computing network 106. Each emergency personnel $\mathbf{122}_{1\text{-}N}$ of the breathable-air supply system 102 may be given a dedicated web interface where a user thereof can monitor breathable-air supply system 102, view historical data, use mobile controls, initiate air tests, and/or obtain printed reports, etc. associated with different units of the breathable-air supply system 102.

FIG. 1 illustrates the remote operation of the smart lock 118 through cloud computing network 106 of breathable-air supply command center 110, according to one embodiment. In circle '1', the real-time sensory data 172 of array of sensors $\mathbf{104}_{1\text{-}N}$ from each units of the breathable-air supply system 102 (e.g., internal air fill station 202, air monitoring system 204, air storage system 206, power backup unit 208, alarm system 210, isolation and bypass control system 212, exterior mobile air connection panel 214, fire control room 222, etc.) may be communicated to the breathable air supply command center 110 and/or emergency personnel 122$_{1-N}$ through the cloud computing network 106.

In circle '2', the cloud computing network 106 may automatically detect an error and/or fault (e.g., increased temperature, variation in pressure, leakage, anomalies in the air quality parameters, etc.) in any of the components (e.g., internal air fill station 202, air monitoring system 204, air storage system 206, etc.) and/or air standpipes 302 of the breathable-air supply system 102 using the software module 116. In circle '3', the breathable air supply command center 110 and/or the fire station 112 may regulate the array of sensors 104$_{1-N}$ of the breathable-air supply system 102 using the sensor module 114 of the cloud computing network 106. In circle '4', the cloud computing network 106 may automatically generate and send a recommendation to rectify errors/faults using software module 116. In circle '5', the emergency personnel 122$_{1-N}$ may automatically send signals via computing device 120$_{1-N}$ to unlock a particular component or a number of components of the breathable-air supply system 102.

FIG. 2 shows breathable-air supply system 102 of FIG. 1 in more detail. The array of sensors 104$_{1-N}$ associated with the smart lock 118 may include a motion sensor 220 in the one or more location(s) 370 (e.g., the air monitoring system 204, internal air fill station 202, air storage system 206, isolation and bypass control system 212, power backup unit 208, the alarm system 210, exterior mobile air connection panel 214) of the breathable-air supply system 102. The motion sensor 220 may be an electronic device that detects a movement and/or presence of nearby emergency personnel 122$_{1-N}$, people, and/or objects in the one or more location(s) 370 of the breathable-air supply system 102. The motion sensor 220 may generate a trigger signal (e.g., trigger signal 194) to activate the video camera 174 when the breathable-air supply system 102 is being accessed by anyone (e.g., emergency personnel 122$_{1-N}$, unauthorized persons, etc) in the unlock state 154.

The motion sensor 220 may further generate a trigger signal (e.g., trigger signal 194) to activate the video camera 174 when tampering with the smart lock 118 is detected. In addition, the motion sensor 220 may activate the video camera 174 when anomalies in the environment associated with the one or more location(s) 370 are detected by the array of sensors 104$_{1-N}$. The video camera 174 may capture the visual recording 142 and/or audio communication 144 ambient to the one or more location(s) 370. The video camera 174 may further communicate the audiovisual incident (e.g., based on visual recording 142 and/or audio communication 144) to the emergency personnel 122$_{1-N}$, breathable air supply command center 110 (e.g., an onsite fire command center, a remote fire command center) and/or a fire control room 222 (example fire command room) via computing devices 120$_{1-N}$ (e.g., smart phone, tablet, etc.) through the cloud computing network 106. Further, the breathable-air supply system 102 may automatically transcribe the audio communication 144 and/or the visual recording 142 ambient to the one or more locations 370, according to one embodiment.

The array of sensors 104$_{1-N}$ may detect a normal state 390 of building 308. Normal state 390, as discussed herein, may refer to a state where no compromise of components of breathable-air supply system 102 is detected. The array of sensors 104$_{1-N}$ may generate an electrical signal to automatically lock the smart lock 118 of the breathable-air supply system 102 whenever the emergency state 380 ends and normal state 390 of the building 308 is detected. Lock state 152 and unlock state 154 of the smart lock 118 may be determined based on sensory data 172 of the array of sensors 104$_{1-N}$ within the breathable-air supply system 102. Further, the smart lock 118 may be remotely accessed (e.g., unlocked and/or locked) by the emergency personnel 122$_{1-N}$, breathable air supply command center 110 (e.g., an onsite fire command center, a remote fire command center) and/or a fire control room 222 via computing devices 120$_{1-N}$ (e.g., smart phone, tablet, etc.) through the implementation of software application 190. Software application 190 may activate the array of sensors 104$_{1-N}$ to generate the electrical signal to lock and/or unlock the smart lock 118 through cloud computing network 106, according to one embodiment.

In another embodiment, the smart lock 118 may include a dual authentication system to unlock the smart lock 118 during the normal state 390 of building 308. One example authentication system may include biometric authentication (e.g., audiovisual identification, fingerprint identification, etc.). Other example authentication systems may include but are not limited to a rapid access system 304 an RFID system, a wireless protocol, a smart card, key fob access, an NFT, a physical key, and/or a web-based identification system.

The smart lock 118 associated with the internal air fill station 202 may secure breathable-air supply system 102 from intrusion and/or tampering. The smart lock 118 may be programmed to automatically unlock the one or more location(s) 370 of internal air fill station 202 usable by emergency personnel 122$_{1-N}$ during the emergency state 380 of building 308. Further, the smart lock 118 may be programmed to automatically lock the one or more location(s) 370 of the internal air fill station 202 accessed by the emergency personnel 122$_{1-N}$ when the emergency state 380 of building 308 ends and the normal state 390 of the building 308 is detected, according to one embodiment. In addition, the internal air fill station 202 may include an air fill charge rate controller, an emergency status indicator, an actuator control valve, a Self-Contained Breathing Apparatus (SCBA) connector unit, a radio repeater, the array of sensors 104$_{1-N}$, and smart lock 118, according to one embodiment.

The air monitoring system 204 may be a collection of elements and/or components that are organized for checking and/or recording the air quality within breathable-air supply system 102. The air monitoring system 204 may include an air quality display unit, an air quality analysis unit, a compressor, array of sensor units 104$_{1-N}$, and smart lock 118 according to one embodiment. The smart lock 118 may be associated with the air monitoring system 204 to secure breathable-air supply system 102 from intrusion and/or tampering. The smart lock 118 may be programmed to automatically unlock the one or more location(s) 370 of the air monitoring system 204 usable by the emergency personnel 122$_{1-N}$ during emergency state 380 of the building 308. In addition, the smart lock 118 may be programmed to automatically lock the one or more location(s) 370 of the air monitoring system 204 usable by the emergency personnel 122$_{1-N}$ on detection of normal state 390 of the building 308, according to one embodiment.

The air quality display unit (not shown) may exhibit the air parameters captured and analyzed by the air quality analysis unit (not shown) of the air monitoring system 204 in real-time. The air quality display unit may be a smart device (e.g., an Android™ based computing device, an iOS® based computing device such as an electronic tablet, electronic notebook, etc.) having a mini touchscreen for visual presentation of the quality of air parameters analyzed by the air analysis unit based on sensory data 172 of the array of sensors $\mathbf{104}_{1-N}$, according to one embodiment.

In another embodiment, the air quality display unit may be an electromechanical device installed at the key locations 370 of building 308 and may be made of a material having fire-rated capabilities. The air quality display unit may communicate through wired and/or wireless means to external devices including computing systems (e.g., computing device $\mathbf{120}_{1-N}$). The array of sensors $\mathbf{104}_{1-N}$ may be configured to automatically trigger recording of the visual incidents discussed above using a camera (e.g., video camera 174) installed on the air quality display unit communicatively coupled to the computing device $\mathbf{120}_{1-N}$ (e.g., smart device, iPad®, tablet, etc.) to provide visual incidents at the fire ground. The air quality display unit may help to monitor the air quality status in the breathable-air supply system 102 remotely in real-time via mobile devices and/or a breathable air supply command center 110 and/or other key locations 370 of the breathable-air supply system 102 and/or building 308.

The air quality analysis unit may be a sensor-based device to automatically detect air quality, moisture and/or pressure in the breathable-air supply system 102. The air quality analysis unit may include air quality sensors 414 (e.g., part of array of sensors $\mathbf{104}_{1-N}$) for continuous monitoring (e.g., 365 days/year) of the breathable-air components. The breathable-air components may include carbon monoxide, carbon dioxide, nitrogen, oxygen, moisture, pressure, hydrocarbon levels, and other breathable air parameters (e.g., oil mist and particulates, odor, etc.). The air quality sensors 414 may include a carbon monoxide sensor 416, a carbon dioxide sensor 418, a nitrogen level sensor 422, an oxygen level sensor 420, a moisture sensor 426, a pressure sensor 428, a hydrocarbon sensor 424, and/or other sensors (e.g. oil mist and particulates sensor, odor sensor, etc.). The air quality display unit may display air quality analysis unit data (e.g., the breathable-air components, parameters, etc.), according to one embodiment.

The air quality analysis unit may use a digital processor unit 430 to check deviation in the air quality parameters in the breathable-air supply system 102. The air quality analysis unit may generate an alert signal (e.g., alert signal 192) if the air-quality parameters are above and/or below predefined threshold levels discussed above. The alert signal 192 may notify emergency personnel $\mathbf{122}_{1-N}$, breathable air supply command center 110 (e.g., an onsite fire command center, a remote fire command center) and/or a fire control room 222 via computing devices $\mathbf{120}_{1-N}$ (e.g., smart phone, tablet, etc.) through the cloud computing network 106 that the emergency state 380 is detected within the building 308. During emergency state 380, the array of sensors $\mathbf{104}_{1-N}$ may generate electrical signals to automatically unlock the smart lock 118 at the one or more location(s) 370 of the breathable-air supply system 102 usable by the emergency personnel $\mathbf{122}_{1-N}$.

In an additional embodiment, the air quality analysis unit of the air monitoring system 204 discussed above may be integrated with cloud computing network 106. The breathable-air supply command center 110 of safety system 150 may be communicatively coupled to the breathable-air supply system 102 and the computing device $\mathbf{120}_{1-N}$/emergency personnel $\mathbf{122}_{1-N}$ through the cloud-computing network 106. The air quality analysis unit may continuously send sensory data 172 of the array of sensors $\mathbf{104}_{1-N}$ of the breathable-air supply system 102 to the breathable-air supply command center 110, fire station 112, and/or emergency personnel $\mathbf{122}_{1-N}$ through a cloud computing network 106. The cloud computing network 106 may enable the breathable-air supply command center 110 and emergency personnel $\mathbf{122}_{1-N}$ to remotely manage and/or continuously monitor (e.g., full vigilance 365 days/year) the air-quality parameters in the breathable-air supply system 102 in real-time via computing device $\mathbf{120}_{1-N}$ through implementation via software application 190, according to one embodiment.

As discussed above, the cloud computing network 106 may use sensor module 114 and software module 116 to check deviations in the air-quality parameters in the breathable-air supply system 102. The cloud computing network 106 may generate an alert signal 192 if the air-quality parameters are above and/or below predefined threshold values discussed above. The alert signal 192 may notify the emergency personnel $\mathbf{122}_{1-N}$, breathable air-supply command center 110 (e.g., an onsite fire command center, a remote fire command center) and/or a fire control room 222 (example fire command room) via computing device $\mathbf{120}_{1-N}$ (e.g., smart phone, tablet, etc.) that the emergency state 380 is detected. During emergency state 380, the array of sensors $\mathbf{104}_{1-N}$ may be configured to generate electrical signals to automatically unlock the smart lock 118 of the one or more location(s) 370 of the breathable-air supply system 102 usable by the emergency personnel $\mathbf{122}_{1-N}$, according to one embodiment.

In one implementation, air monitoring system 204 may include a compressor (not shown); said compressor may be a mechanical device that increases the pressure of a gas in the breathable-air supply system 102. The compressor may be integrated into the air quality analysis unit of the air monitoring system 204 discussed above. The compressor may increase the air pressure in the breathable-air supply system 102 when a deviation in air-quality parameters is detected by the air quality sensors 414 to enable automated purging of air in the breathable-air supply system 102, according to one embodiment.

An air quality sensor 414 may activate a control valve to automatically purge the breathable-air supply system 102 upon detection of a deviation in the air-quality parameters above and/or below predefined threshold values (and/or ranges). The automatic purging may be done to purge a certain amount of air out of breathable-air supply system 102, while the air quality analysis unit may continue monitoring the air-quality parameters. After purging, if the air-quality parameters are less/more than the predefined threshold values (and/or ranges), then the array of sensors $\mathbf{104}_{1-N}$ may generate an alert signal 192 that the emergency state 380 is detected. The array of sensors $\mathbf{104}_{1-N}$ may notify the emergency personnel $\mathbf{122}_{1-N}$, breathable air supply command center 110 (e.g., a remote fire command center, an onsite fire command center) and/or a fire command room (e.g., fire control room 222) via computing devices $\mathbf{120}_{1-N}$ (e.g., smart phone, tablet, etc.) through the cloud computing network 106 that a fault has occurred in the particular unit of the breathable-air supply system 102 that needs immediate attention/correction, according to one embodiment.

An air fill charge rate controller (not shown) may be a hardware device that regulates the flow of breathable air in internal air fill station 202 based on sensory data 172 of the array of sensors $\mathbf{104}_{1-N}$. The air fill charge rate controller may automatically regulate the maximum allowable pressure in SCBA cylinders while replenishing air through internal air fill station 202 and control the charge rate of the air filling to avoid hot fills in the SCBA cylinders. The array of sensors $\mathbf{104}_{1-N}$ may include an air flow sensor 404 to automatically measure and/or regulate the flow rate of air within the internal air fill station 202. The airflow sensor 404 may utilize mechanical and/or electrical means to measure changes in the physical attributes of the air within safety system 150 and calculate flow thereof. The air flow sensor 404 may continuously monitor the air flow rate within the internal air fill station 202. The airflow sensor 404 may generate the alert signal 192 during a catastrophic event (e.g. malfunctioning of equipment, other anomalies in the air parameters, an event associated with emergency state 380 etc.) and/or if the charge rate of the air flow is not within a predefined threshold limit (e.g., high air flow beyond the pre-described quantity of an SCBA maximum flow). The alert signal 192 may notify emergency personnel $\mathbf{122}_{1\text{-}N}$, breathable air supply command center 110 (e.g., an onsite fire command center, a remote fire command center) and/or a fire control room 222 (example fire command room) via computing devices $\mathbf{120}_{1\text{-}N}$ (e.g., smart phone, tablet, etc.) that the emergency state 380 is detected through cloud computing network 106, according to one embodiment.

In one embodiment, the array of sensors $\mathbf{104}_{1\text{-}N}$ may automatically unlock the smart lock 118 of internal air fill station 202 in which the emergency state 380 is detected. In another embodiment, the air flow sensor 404 may generate an electrical signal to automatically activate actuator valves (not shown) to shut down and/or isolate internal air fill station 202 when the emergency state 380 is detected.

According to one embodiment, internal air fill station 202 may include an emergency status indicator (not shown). The array of sensors $\mathbf{104}_{1\text{-}N}$ (e.g., smoke sensor 406, etc.) associated with internal fill station 202 may be configured to detect a low and/or a poor visibility state (example emergency state 380) within building 308. In other words, the array of sensors $\mathbf{104}_{1\text{-}N}$ may detect an emergency state 380 of building 308 during low and/or poor visibility conditions. During the emergency state 380, the array of sensors $\mathbf{104}_{1\text{-}N}$ may generate an electrical signal to automatically unlock the smart lock 118 of the one or more location(s) 370 of the breathable-air supply system 102 usable by the emergency personnel $\mathbf{122}_{1\text{-}N}$. The array of sensors $\mathbf{104}_{1\text{-}N}$ may further generate the electrical signal to activate the emergency status indicator when the emergency state 380 of building 308 is detected. The emergency status indicator may be a signal unit that helps the emergency personnel $\mathbf{122}_{1\text{-}N}$ identify internal air fill station 202 in critical situations (e.g., low or poor visibility during fire and/or smoke, etc.).

According to one embodiment, the emergency status indicator may include indication systems associated with internal air fill station 202 serving as status indicators. These indication systems may facilitate the emergency responders, emergency personnel $\mathbf{122}_{1\text{-}N}$ and/or firefighters in locating internal air fill station 202 under low visibility conditions via blue light, strobe light, and/or white light, etc.

In another embodiment, the emergency status indicator associated with internal air fill station 202 may include a thermal imaging marker (TIC) (not shown) and/or glow locators (not shown). The TIC and/or the glow locators may be integrated with internal air fill station 202 and may include thermal imaging cameras for quick decision-making on the part of the firefighters, emergency personnel $\mathbf{122}_{1\text{-}N}$ and/or emergency responders and serving as indicators of the directions to move along in limited visibility conditions.

The actuator control valve(s) associated with internal air fill station 202 may be a hardware and/or software control mechanism that automatically open and close to control the flow of air in internal air fill station 202 and/or other components of breathable-air supply system 102 remotely during the emergency state 380 of the building 308, according to one embodiment. The actuator control valve(s) may be remotely controlled by isolation and bypass control system 212. In addition, the actuator control valve(s) may be controlled by breathable-air supply command center 110 (e.g., an onsite fire command center, a remote fire command center) and/or a fire control room 222 (example fire command room) and/or emergency personnel $\mathbf{122}_{1\text{-}N}$ via computing device $\mathbf{120}_{1\text{-}N}$ through the cloud computing network 106. Based on sensory data 172 of the array of sensors $\mathbf{104}_{1\text{-}N}$, the actuator control valve(s) may be able to automatically isolate and/or bypass internal air fill station 202 in which a fault has occurred, according to one embodiment.

An SCBA connector unit (not shown) may be a device and/or means for securing an SCBA cylinder hose to internal air fill station 202 to allow breathable air to flow from internal air fill station 202 to an SCBA cylinder for replenishment thereof and to allow easy disconnection after the replenishment, according to one embodiment.

According to one embodiment, internal air fill station 202 may include a radio repeater. The radio repeater may be integrated with and/or be within internal air fill station 202 to increase an area of coverage and robustness of communication between firefighters, emergency personnel $\mathbf{122}_{1\text{-}N}$ and/or emergency responders and breathable air supply command center 110. The radio repeater may repeat a radio signal received at a first frequency during transmission thereof at a second frequency. The radio repeater may be located at a place where a virtual Line-of-Sight (LoS) to all radios in safety system 150 is possible, according to one embodiment.

The breathable-air supply system 102 may further include air storage system 206. Air storage system 206 may be an assembly of equipment organized for stocking and/or managing the breathable air in the breathable-air supply system 102 for replenishing the SCBA cylinders. Air storage system 206 may further include storage tanks (not shown), a calibration system (not shown), a primary storage tank (not shown), a booster pump (not shown), an array of sensors $\mathbf{104}_{1\text{-}N}$, and smart lock 118. The smart lock 118 associated with air storage system 206 may secure breathable-air supply system 102 from intrusion and/or unauthorized access. The smart lock 118 may be programmed to automatically unlock one or more locations 370 of air storage system 206 usable by the emergency personnel $\mathbf{122}_{1\text{-}N}$ during emergency state 380 of building 308, according to one embodiment.

A storage tank may be a breathable air repository where the breathable air is stocked for replenishing the SCBA cylinders. The air stored in the storage tank may be supplied to internal air fill station 202 through a primary storage tank to refill the SCBA cylinders. The primary storage tank may be a set of breathable air storage tanks that is used to supply breathable air to internal air fill station 202 of the breathable-air supply system 102 to enable refilling one or more SCBA cylinders. The booster pump may be configured between the storage tanks and the primary storage tank from which air is drawn to internal air fill station 202. The booster pump may help transfer air from the storage tanks to the primary storage tank when required. The booster pump may also help refill the SCBA cylinders within and/or less than 2 minutes once connected to internal air fill station 202. The booster pump may be calibrated by using the calibration system to maintain an optimum level of pressure in the primary storage tank to supply breathable air to internal air fill station 202. The calibration system may have an actuator valve to bypass air storage system 206 once a mobile air connection unit 218 is connected to breathable-air supply unit 102, according to one embodiment.

The array of sensors $104_{1-N}$ (e.g., pressure sensors) associated with air storage system 206 may continuously monitor the air pressure in the primary storage tank. If the air pressure in the primary storage tank is less and/or more than the optimal level of pressure (e.g., 6000 pounds per square inch (PSI)), the array of sensors $104_{1-N}$ may automatically activate the booster pump. The booster pump may be configured to maintain the air pressure in the primary storage tank at an optimal level of pressure (e.g., 6000 PSI) to enable airflow to internal air fill station 202. If the air pressure of the primary storage tank goes beyond and/or below predefined limits, the booster pump may transfer air between the storage tanks and the primary storage tank to maintain the air pressure of the primary storage tank within the predefined limits, according to one embodiment. Low-pressure air may drive pistons within the booster pump to enable maximization of air within the storage tanks, according to one embodiment. In another embodiment, the array of sensors $104_{1-N}$ may automatically activate the actuator valve within the calibration system to bypass air storage system 206 once mobile air connection unit 218 is connected to the breathable-air supply unit 102.

In another embodiment, if the booster pump fails to maintain the air pressure of the primary storage tank at the optimal level of pressure (e.g. 6000 PSI), the array of sensors $104_{1-N}$ may generate an alert signal 192 to notify the emergency personnel $122_{1-N}$, breathable air supply command center 110 (e.g., a remote fire command center, an onsite fire command center) and/or a fire control room 222 (example fire command room) via computing devices $120_{1-N}$ (e.g., smart phone, tablet, etc.) that the emergency state 380 is detected within breathable-air supply unit 102. During the emergency state 380, the array of sensors $104_{1-N}$ may generate electrical signals to automatically unlock the smart lock 118 associated with air storage system 206 (e.g., the calibration system, booster pump, etc.) usable by the emergency personnel $122_{1-N}$.

In yet another embodiment, the calibration system may use an array of sensors $104_{1-N}$ to recalibrate the booster pump to maintain the optimum level of pressure in the primary storage tank during the emergency state 380. Further, the actuator valve within the calibration system may be remotely operated by emergency personnel $122_{1-N}$, breathable air supply command center 110 (e.g., a remote fire command center, an onsite fire command center) and/or a fire control room 222 (example fire command room) via computing devices $120_{1-N}$ (e.g., smart phone, tablet, etc.) by using the array of sensors $104_{1-N}$ within breathable-air supply system 102 through cloud computing network 106.

In yet another embodiment, isolation and bypass control system 212 may be a set of components working together to automatically switch ON/OFF and/or bypass internal air fill station 202 when a fault and/or error is detected within and/or adjacent to a particular internal air fill station 202. Isolation and bypass control system 212 may include an addressable motherboard and circuitry associated therewith, smart lock 118, and array of sensors $104_{1-N}$. Isolation and bypass control system 212 may be associated with smart lock 118 to secure breathable-air supply system 102 from intrusion and/or tampering. Smart lock 118 may be programmed to automatically unlock one or more location(s) 370 of isolation and bypass control system 212 usable by the emergency personnel $122_{1-N}$ during emergency state 380 of the building 308.

The array of sensors $104_{1-N}$ associated with isolation and bypass control system 212 may continuously monitor air-quality parameters in breathable-air supply system 102. The array of sensors $104_{1-N}$ associated with isolation and bypass control system 212 may be programmed to activate the actuator control valves to automatically bypass and/or isolate a particular air fill panel (e.g., internal air fill station 202) on the detection of deviation of air-quality parameters from the predefined threshold values (and ranges) discussed above based on sensory data 172 of the array of sensors $104_{1-N}$. Actuator control valves provided with each fill panel (e.g., internal air fill station 202) in a floor of building 308 may be turned ON/OFF such that a combination of the fill panels may be isolated as per requirements, according to one embodiment.

In another embodiment, power backup unit 208 may be a device and/or a system to provide instantaneous, uninterruptible power to components of breathable-air supply system 102 during the emergency state 380 of building 308. Power backup unit 208 may be associated with a smart lock 118 to secure breathable-air supply system 102 from intrusion. Smart lock 118 may be programmed to automatically unlock one or more location(s) 370 (e.g., each location 370) of power backup unit 208 usable by emergency personnel $122_{1-N}$ during an emergency state 380 of building 308. The array of sensors $104_{1-N}$ (e.g., power sensor 412, etc.) associated with power backup unit 208 may continuously monitor the power supply within the breathable-air supply system 102. The array of sensors $104_{1-N}$ may activate power backup unit 208 if any anomalies in the power supply are detected (e.g., deviation in current, voltage, power and/or power quality parameters of breathable-air supply system 102, etc.).

In another embodiment, an alarm system 210 may be a device to transmit and/or broadcast an alert signal 192 when emergency state 380 of building 308 is detected. Alarm system 210 may be associated with a smart lock 118 to secure breathable-air supply system 102 (or, alarm system 210) from intrusion and/or tampering. Smart lock 118 may be programmed to automatically unlock one or more location(s) 370 (e.g., each location 370) of alarm system 210 usable by emergency personnel $122_{1-N}$ during emergency state 380 of building 308. The array of sensors $104_{1-N}$ associated with breathable-air supply system 102 may generate an alert signal 192 if anomalies (e.g., increased temperature, variation in pressure, leakage, anomalies in the air-quality parameters, availability of air, etc.) in any of the components of the breathable-air supply system 102 are detected thereby. Alert signal 192 may activate alarm system 210 to enable alarm system 210 to notify emergency personnel $122_{1-N}$, breathable air supply command center 110 (e.g., a remote fire command center, an onsite fire command center) and/or a fire control room 222 (example fire command room) via computing devices $120_{1-N}$ (e.g., smart phone, tablet, etc.) through cloud computing network 106 that emergency state 380 of building 308 is detected, according to one embodiment.

In yet another embodiment, mobile air connection unit 218 may be a vehicle (e.g., a fire truck) equipped with a breathable air replenishment system to readily supply the breathable air to the breathable-air supply system 102 in case of an emergency. Exterior mobile air connection panel 214 may be a console provided at a periphery of building 308 to readily access and supply the breathable air to components of breathable-air supply system 102. Exterior mobile air connection panel 214 may include an external isolation and bypass control system 216, an array of sensors $104_{1-N}$, and a smart lock 118. Exterior mobile air connection panel 214 may be associated with smart lock 118 to secure breathable-air supply system 102 (or, exterior mobile air connection panel 214) from intrusion and/or tampering. Smart lock 118 may be programmed to automatically unlock exterior mobile air connection panel 214 usable by the emergency personnel $\mathbf{122}_{1\text{-}N}$ during emergency state 380 of building 308. External isolation and bypass control system 216 may be a set of components working together to isolate and/or bypass air storage system 206 to enable air supply from mobile air connection unit 218 through exterior mobile air connection panel 214.

In another embodiment, external isolation and bypass control system 216 may isolate and/or bypass air storage system 206 when the array of sensors $\mathbf{104}_{1\text{-}N}$ detects emergency state 380. External isolation and bypass control system 216 may use the array of sensors $\mathbf{104}_{1\text{-}N}$ to isolate and/or bypass air storage system 206.

In another embodiment, fire control room 222 (example fire command room) may enable emergency personnel $\mathbf{122}_{1\text{-}N}$ to manage and/or continuously monitor components of breathable-air supply system 102 in real-time. Fire control room 222 may be associated with a smart lock 118 to secure breathable-air supply system 102 (or, fire control room 222) from intrusion. Smart lock 118 may be programmed to automatically unlock fire control room 222 usable by emergency personnel $\mathbf{122}_{1\text{-}N}$ during emergency state 380 of building 308. Sensory data 172 from the array of sensors $\mathbf{104}_{1\text{-}N}$ may be collected in fire control room 222. Fire control room 222 may function as a primary command center for building 308 in which a particular breathable-air supply system 102 is installed, according to one embodiment. Further, fire control room 222 may authenticate emergency personnel $\mathbf{122}_{1\text{-}N}$ to access various components of the breathable-air supply system 102.

Figure 3:
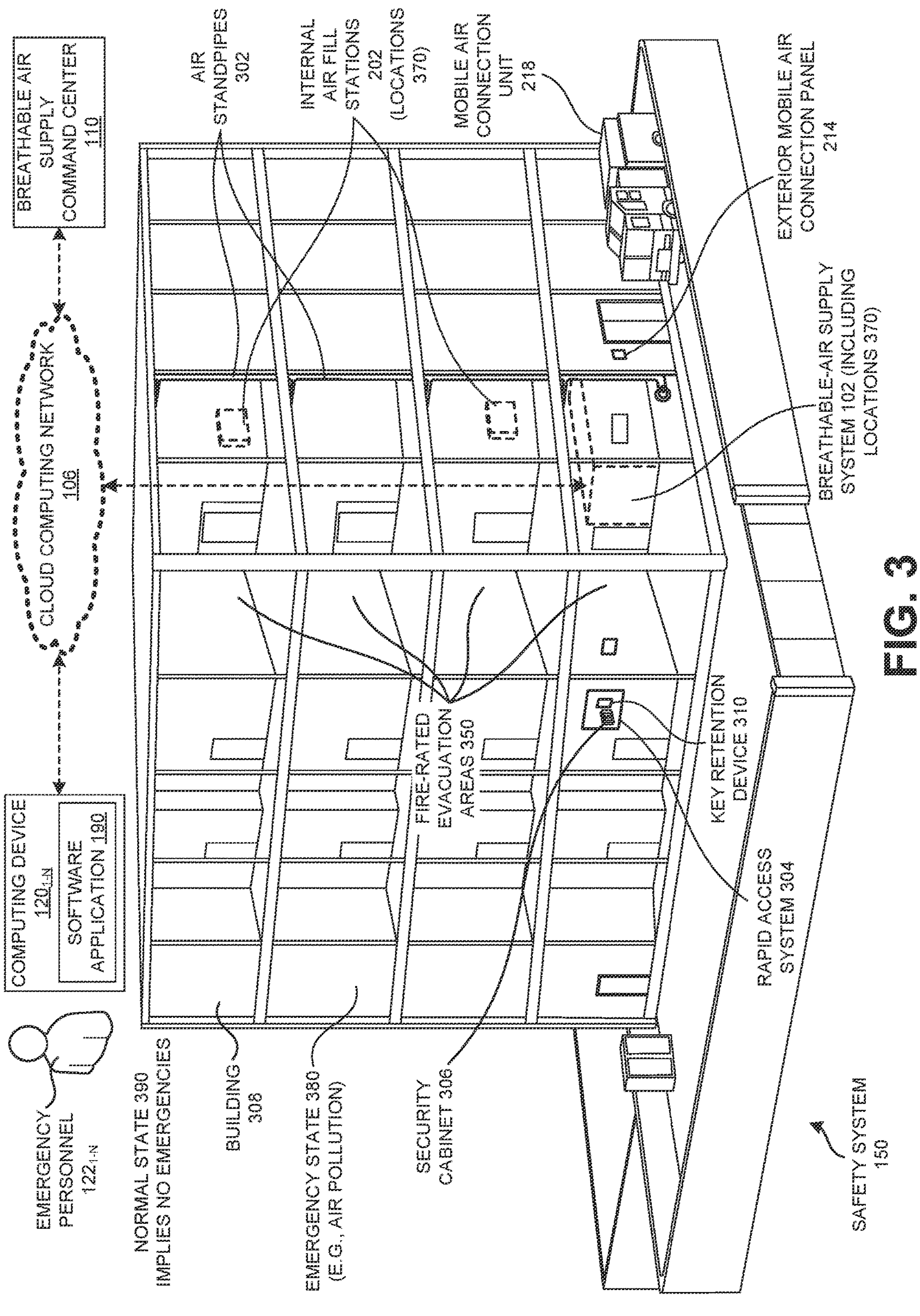
FIG. 3 is a schematic and perspective view of the safety system of FIGS. 1-2, according to one embodiment.

FIG. 3 is a schematic and perspective view of safety system 150 associated with building 308, according to one or more embodiments. Air standpipes 302 may include a fire-rated tubing and/or hose provided at building 308 to supply breathable air to internal air fill station(s) 202 located on different floors of building 308. For example, internal air fill station 202 may be located in a fire-rated evacuation area 350 (e.g., a fire-rated stairwell) of building 308 (e.g., a high-rise building, a medium-rise building, a low-rise building, a multistory building, a skyscraper, a warehouse, a shopping mall, a hypermart, an industrial structure, etc.), according to one embodiment.

Building 308 may be extended to an occupiable structure such as a mid and/or a high-rise building, a large horizontal structure such as a big box retail store, a warehouse and/or a manufacturing plant, a tunnel, a wind turbine, a large marine vessel and a mine shaft. Other variations therein are within the scope of the exemplary embodiments discussed herein.

Breathable-air supply system 102 may be integrated with a rapid access system 304. Rapid access system 304 may be an electronic lock and/or a mechanical lock that provides a quick and simple way to lock and/or unlock smart lock 118 through RFID access, smart cards, key fob access, NFTs, keys, biometric access and/or web-based identification systems.

Breathable-air supply command center 110 may remotely generate an authorized key for emergency personnel $\mathbf{122}_{1\text{-}N}$ through cloud computing network 106 to access and automatically adjust components of the breathable-air supply system 102. The authorized key may be activated for a particular duration of time. The authorized key may be sent to computing devices $\mathbf{120}_{1\text{-}N}$ (e.g., a smart device, a mobile device, an iPad®, a laptop, a computer) along with the triggering notifications (e.g., security notifications via key fobs, RFID, smart cards), according to one embodiment.

In addition, along with the mobile, wireless and key fob access control, breathable-air supply system 102 may include rapid access system 304 discussed above. Rapid access system 304 may include a key retention device 310, a security cabinet 306 and a master key (not shown). Key retention device 310 may be integrated with cloud computing network 106. Key retention device 310 may also be communicatively coupled with breathable-air supply command center 110. Rapid access system 304 may include an automatic sensor that may send a trigger signal 194 to breathable-air supply command center 110 whenever someone tries to access key retention device 310, according to one embodiment.

Breathable-air supply command center 110 may generate an access personal identification number (PIN) and send the access PIN to computing device $\mathbf{120}_{1\text{-}N}$ of emergency personnel $\mathbf{122}_{1\text{-}N}$. Key retention device 310 may retain the master key and only release the master key to emergency personnel $\mathbf{122}_{1\text{-}N}$ with authorized PIN codes sent to computing devices $\mathbf{120}_{1\text{-}N}$ thereof. Cloud computing network 106 may have a retrievable audit trail unit (not shown) that may record the date and time when the master key is taken and when the master key is returned by emergency personnel $\mathbf{122}_{1\text{-}N}$. The retrievable audit trail unit may also record the identification of emergency personnel $\mathbf{122}_{1\text{-}N}$ associated with the taking and the return of the master key. The retrievable audit trail unit may further generate comprehensive audit trail reports for future assessments. Security cabinet 306 of rapid access system 304 may house both the master key and other mechanical keys and may provide temporary access to emergency responders, emergency personnel $\mathbf{122}_{1\text{-}N}$ and/or firefighters through the master key, according to one embodiment.

Figure 4:
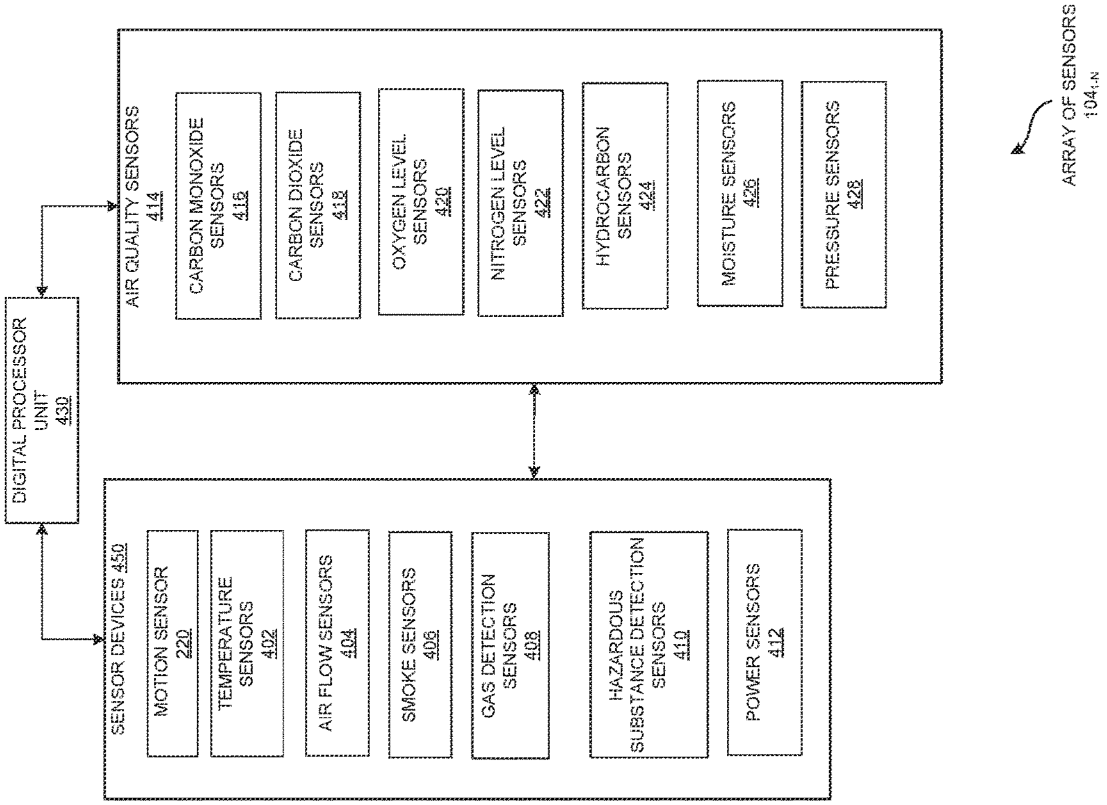
FIG. 4 is a schematic view of an array of sensors of the breathable-air supply system of FIGS. 1-3, according to one embodiment.

FIG. 4 shows array of sensors $\mathbf{104}_{1\text{-}N}$ of breathable-air supply system 102, according to one embodiment. The array of sensors $\mathbf{104}_{1\text{-}N}$ may include air quality sensors 414, sensor devices 450, and a digital processor unit 430. The array of sensors $\mathbf{104}_{1\text{-}N}$ may be configured to detect emergency state 380 of building 308 whenever a certain parameter (e.g., air-quality parameter) of breathable-air supply system 102 is above and/or below the predefined threshold values (and/or ranges) discussed above. During emergency state 380 of building 308, the array of sensors $\mathbf{104}_{1\text{-}N}$ may generate an electrical signal to automatically unlock smart lock 118 of one or more location(s) 370 (e.g., each location 370) of the breathable-air supply system 102 usable by the emergency personnel $\mathbf{122}_{1\text{-}N}$, according to one embodiment.

Air quality sensors 414 may include a collection of sensors including but not limited to carbon monoxide sensors 416, carbon dioxide sensors 418, oxygen level sensors 420, nitrogen level sensors 422, hydrocarbon sensors 424, moisture sensors 426, pressure sensors 428 and other air-quality parameter measuring sensors (e.g., oil mist and particulates sensor, odor sensor, etc.). Carbon monoxide sensor 416 may trigger emergency state 380 of building 308 when a level of ambient carbon monoxide exceeds a first threshold predetermined value (e.g., 5 ppm, 10 ppm). Carbon dioxide sensor 418 may trigger emergency state 380 of the building when a level of ambient carbon dioxide exceeds a second predetermined threshold value (e.g., 1000 ppm, 1200 ppm). Oxygen level sensor 420 may trigger emergency state 380 of building 308 when a level of ambient oxygen falls outside a predetermined range of values (e.g., between 19.5% and 23.5%). Nitrogen level sensor 422 may trigger emergency state 380 of building 308 when a level of nitrogen falls below a third predetermined threshold value (e.g., 75%). Further, nitrogen level sensor 422 may also trigger emergency state 380 of building 308 when a level of nitrogen rises above a fourth predetermined threshold value (e.g., 81%), according to one embodiment.

In another embodiment, hydrocarbon sensor 424 may trigger emergency state 380 of building 308 when a condensed hydrocarbon content exceeds a fifth predetermined threshold value (e.g., 5 milligrams per cubic meter of air). Moisture sensor 426 may trigger emergency state 380 of building 308 when a moisture concentration exceeds a sixth predetermined threshold value (e.g., 24 ppm by volume). Pressure sensor 428 may trigger emergency state 380 of building 308 when pressure falls below a seventh predetermined threshold value (e.g., 90 percent of the maintenance pressure specified in a fire code). In another embodiment, pressure sensor 428 may further be used to detect the pressure in the primary storage tank discussed above. Here, pressure sensor 428 may trigger emergency state 380 of building 308 when the booster pump discussed above fails to maintain the optimal level of pressure (e.g., 6000 PSI) in the primary storage tank.

The sensor device 450 may include a collection of sensors such as a motion sensor 220, temperature sensors 402, air flow sensors 404, smoke sensors 406, gas detection sensors 408, hazardous substance detection sensors 410, power sensors 412 and/or other anomaly measuring sensors (e.g. environmental condition measuring sensors, malfunctioning of equipment detection sensors, etc.). Motion sensor 220, as discussed above, may be an electronic device that detects the movement and/or presence of nearby emergency personnel 122$_{1-N}$ and/or people and/or objects in the one or more location(s) 370 (e.g., access locations) of breathable-air supply system 102. Motion sensor 220 may further detect unlock state 154 of smart lock 118. Motion sensor 220 may generate a trigger signal 194 to activate video camera 174 when breathable-air supply system 102 is accessed by anyone (e.g., emergency personnel 122$_{1-N}$, unauthorized persons, etc.) in unlock state 154. Motion sensor 220 may also generate emergency state 380 of building 308 when tampering with smart lock 118 is detected. In addition, motion sensor 220 may activate video camera 174 when anomalies in environmental conditions associated with the one or more location(s) 370 are detected, according to one embodiment.

Temperature sensor 402 is a device that may be used to measure the temperatures of different components (e.g. air, liquid, and/or solid matter, etc.) within breathable-air supply system 102. Temperature sensor 402 may further measure the temperatures of different equipment within the breathable-air supply system 102. Also, temperature sensor 402 may continuously monitor the temperatures of breathable-air supply system 102. Temperature sensor 402 may trigger emergency state 380 of building 308 when a temperature within breathable-air supply system 102 is above and/or below predefined thresholds. In addition, temperature sensor 402 may be used to measure an environmental temperature within breathable-air supply system 102. Temperature sensor 402 may trigger emergency state 380 of building 308 when the environment temperature of building 308 is above and/or below predefined thresholds, according to one embodiment.

Air flow sensors 404 may automatically measure and/or regulate the flow rate of air within breathable-air supply system 102. Air flow sensor 404 may utilize both mechanical and electrical means to measure changes in physical attributes of the air within breathable-air supply system 102 and calculate flow thereof. Air flow sensor 404 may continuously monitor the air flow rate within the breathable-air supply system 102. Air flow sensor 404 may trigger emergency state 380 of building 308 during a catastrophic event (e.g. malfunctioning of equipment, other anomalies in the air-quality parameters, etc.) and/or if a charge rate of the air flow is not within predefined threshold limits (e.g., high air flow beyond a pre-described quantity of an SCBA maximum flow).

Smoke sensor 406 maybe a device that detects fires and/or smoke by sensing small particles in the air. Smoke sensor 406 may trigger emergency state 380 of building 308 when the fires and/or smoke particles are above certain threshold values. In addition, smoke sensor 406 may activate the emergency status indicator discussed above that helps emergency personnel 122$_{1-N}$ identify internal air fill station 202 in critical situations (e.g., low or poor visibility during the fire and/or smoke, etc.). Gas detection sensor 408 may be a device that detects air leakage within breathable-air supply system 102. Gas detection sensor 408 may detect emergency state 380 of building 308 when air leakage within breathable-air supply system 102 is detected. Hazardous substance detection sensor 410 may detect and/or measure the presence of specific toxic gases within breathable-air supply system 102. Hazardous substance detection sensor 410 may trigger emergency state 380 of building 308 when specific toxic gases within breathable-air supply system 102 are detected, according to one embodiment.

Power sensor 412 may be used to measure the electrical power parameters (e.g., voltage, current, power and other power quality parameters, etc.) of breathable-air supply system 102. Power sensor 412 may trigger emergency state 380 of building 308 when a deviation in the electrical power parameters is above and/or below predefined threshold limits (e.g., as per IEEE standards), according to one embodiment.

Digital processor unit 430 may take real-time sensory data 172 of the array of sensors 104$_{1-N}$ and use statistical analysis and/or artificial intelligence algorithm(s) to check deviation in the breathable-air/air-quality parameters (e.g., temperature, pressure, air components, air replenishment, availability of air, air leakage, fire detection, air flow, power supply, oil mist and particulates, odor, etc.) in breathable-air supply system 102. In one or more embodiments, digital processor unit 430 may be associated with a processor (e.g., a microprocessor, a microcontroller) to perform all functionalities and execute operations thereof associated with the array of sensors 104$_{1-N}$.

Figure 5A:
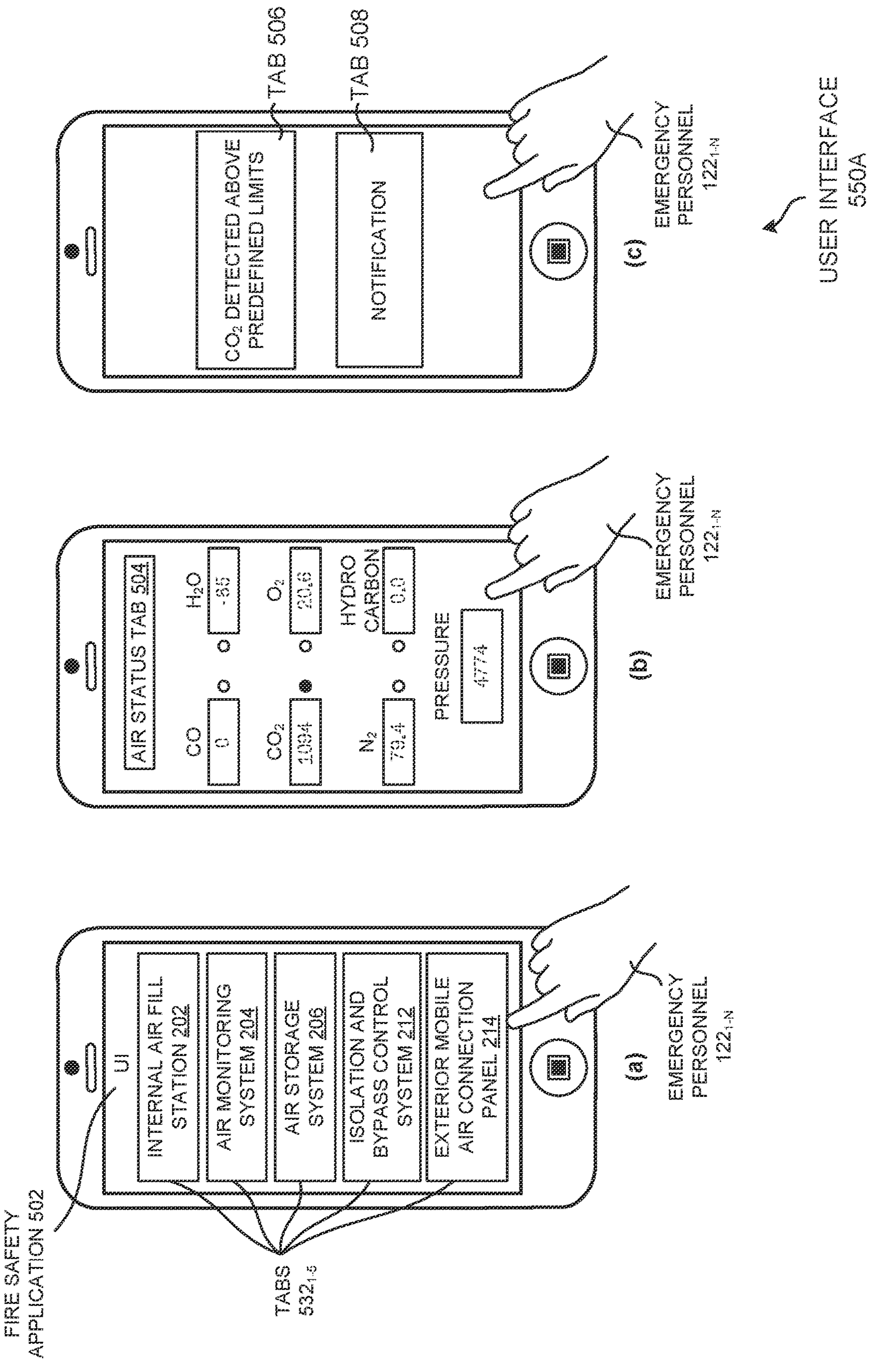
FIG. 5A is a user interface view of a fire safety application executing on a computing device of the safety system of FIGS. 1 and 3, according to one embodiment.

FIG. 5A shows a user interface 550A of a fire safety application 502 (an example software application 190 executing on computing device 120$_{1-N}$), according to one embodiment. Particularly, FIG. 5A illustrates fire safety application 502 of cloud computing network 106 execution on computing device 120$_{1-N}$ that displays parameters detected by the array of sensors 104$_{1-N}$ of breathable-air supply system 102, according to one embodiment. As shown in '(a)', user interface 550A of breathable-air supply system 102 may help emergency personnel 122$_{1-N}$ to view and monitor the different working parameters of units of breathable-air supply system 102 (e.g., internal air fill station 202, air monitoring system 204, air storage system 206, isolation and bypass control system 212, exterior mobile air connection panel 214). Emergency personnel 122$_{1-N}$ may click on multiple tabs (e.g., tabs 5321-*s*) to view different air/air-quality parameters of breathable-air supply system 102. As shown in '(b)', an air status tab 504 may display various air/air-quality parameters of breathable-air supply system 102, according to one embodiment.

For example, emergency personnel 122$_{1-N}$ may view the different air-quality parameters (e.g., carbon monoxide (CO), water vapor/moisture ($H_2O$), carbon dioxide ($CO_2$), oxygen ($O_2$), nitrogen ($N_2$), hydrocarbon, pressure) of air monitoring system 204 by navigating air status tab 504. The array of sensors 104$_{1-N}$ of breathable-air supply system 102 may notify emergency personnel 122$_{1-N}$ through cloud computing network 106 that some fault and/or anomalies (e.g., air contamination, particulates, pollutants, etc.) are detected in one or more unit(s) of breathable-air supply system 102. User interface 550A may help emergency personnel 122$_{1-N}$ view and navigate the air/air-quality parameters of breathable-air supply system 102. Emergency personnel 122$_{1-N}$ may further click on a particular tab showing the detected fault in a particular air parameter (e.g., $CO_2$) to enable remedial actions to be taken, according to one embodiment.

As shown in '(c)', emergency personnel 122$_{1-N}$ may receive a notification in tab 506 that the parameter is above and/or below predefined threshold values (e.g., $CO_2$ detected above a predefined threshold value). Emergency personnel 122$_{1-N}$ may also receive a notification in tab 508 to take corrective measures to rectify the fault. Emergency personnel 122$_{1-N}$ may thus be able to take corrective measures and/or actions that are remotely permissible by computing device 120$_{1-N}$ to rectify the fault in breathable-air supply system 102 unit through cloud computing network 106. The corrective measures may include sensor recalibrations, activation and/or deactivation of the actuator control valve, leakage prevention, temperature and pressure management, etc., according to one embodiment. Other corrective measures are within the scope of the exemplary embodiments discussed herein.

Figure 5B:
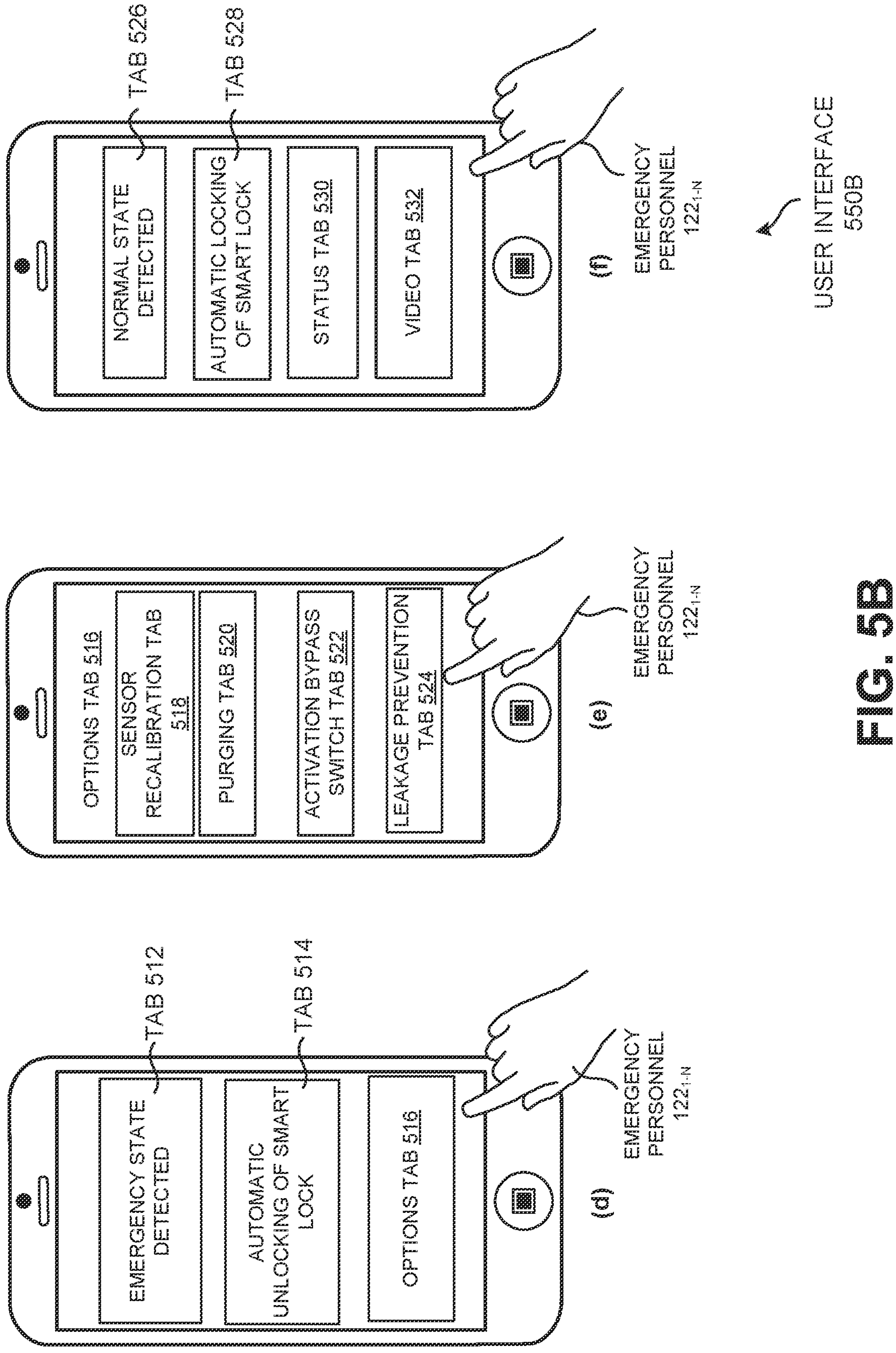
FIG. 5B is another user interface view of the fire safety application of FIG. 5A, according to one embodiment.

FIG. 5B shows another user interface 550B adding interactions (d) to (f) that is arrivable from user interface 550A, according to one embodiment. As shown in '(d)', user interface 550B may show a tab 512 relevant to detection of emergency status 380 and a tab 514 relevant to automatic unlocking of smart lock 118, and an options tab 516. Tab 512 may notify emergency personnel 122$_{1-N}$ that emergency state 380 in a particular breathable-air supply system 102 (e.g., including internal air fill station 202, air storage system 206, etc.) is detected by the array of sensors 104$_{1-N}$. Tab 514 may notify emergency personnel 122$_{1-N}$ that smart lock 118 associated with breathable-air supply system 102 may unlock one or more location(s) 370 (e.g., each location 370) of breathable-air supply system 102 needed to be accessed by emergency personnel 122$_{1-N}$ during emergency state 380 of building 308.

Emergency personnel 122$_{1-N}$ may select options tab 516 to navigate various options to take corrective measures to rectify the fault, as discussed above. User interface 550B shown in '(e)' displays a sensor recalibration tab 518, a purging tab 520, an activation bypass switch tab 522 and a leakage prevention tab 524 to enable emergency personnel 122$_{1-N}$ take corrective measures remotely.

User interface 550B shown in '(f)' displays a tab 526 relevant to detection of normal state 390, a tab 528 relevant to automatic locking of smart lock 118, a status tab 530, and a video tab 532. Tab 526 may notify emergency personnel 122$_{1-N}$ that emergency state 380 has ended and normal state 390 of building 308 has been detected. Tab 528 may notify emergency personnel 122$_{1-N}$ that smart lock 118 associated with breathable-air supply system 102 has been automatically locked for one or more location(s) 370 (e.g., each location 370) of breathable-air supply system 102 accessed by the emergency personnel 122$_{1-N}$. Status tab 530 may show whether the fault in breathable-air supply system 102 is rectified or not.

Video tab 532 may enable emergency personnel 122$_{1-N}$ to remotely view visual recording 142 of the one or more location(s) 370 (e.g., each location 370)/components of breathable-air supply system 102 for monitoring thereof, according to one embodiment. All reasonable variations are within the scope of the exemplary embodiments discussed herein.

Figure 6:
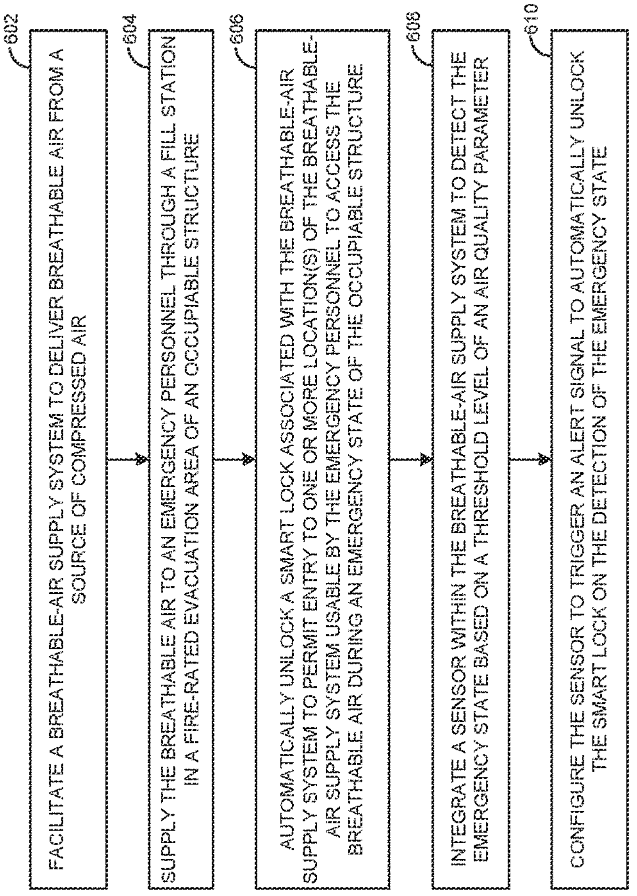
FIG. 6 is a process flow diagram detailing the operations in a sensor-based smart unlocking of a firefighter air replenishment system, according to one embodiment.

FIG. 6 shows a process flow diagram detailing the operations in a sensor-based smart unlocking of a firefighter air replenishment system (e.g., safety system 150), according to one embodiment. In one or more embodiments, operation 602 may involve facilitating a breathable-air supply system (e.g., breathable-air supply system 102) to deliver breathable air from a source of compressed air (e.g., source of compressed air 170). In one or more embodiments, operation 604 may involve supplying the breathable air to an emergency personnel (e.g., emergency personnel 122$_{1-N}$) through a fill station (e.g., internal air fill station 202) in a fire-rated evacuation area (e.g., fire-rated evacuation area 350) of an occupiable structure (e.g., building 308).

In one or more embodiments, operation 606 may involve automatically unlocking a smart lock (e.g., smart lock 118) associated with the breathable-air supply system to permit entry to one or more location(s) (e.g., one or more location(s) 370) of the breathable-air supply system usable by the emergency personnel to access the breathable air during an emergency state (e.g., emergency state 380) of the occupiable structure. In one or more embodiments, operation 608 may involve integrating a sensor (e.g., array of sensors 104$_{1-N}$) within the breathable-air supply system to detect the emergency state based on a threshold level (e.g., first predetermined threshold value, second predetermined threshold value) of an air quality parameter. In one or more embodiments, operation 610 may then involve configuring the sensor to trigger an alert signal (e.g., alert signal 192) to automatically unlock the smart lock on the detection of the emergency state.

The methods and systems disclosed herein may be implemented in any means for achieving various aspects, and may be executed in a form of a non-transitory machine-readable medium embodying a set of instructions that, when executed by a machine, causes the machine to perform any of the operations disclosed herein.

Although the present embodiments have been described with reference to specific example embodiments, it will be evident that various modifications and changes may be made to these embodiments without departing from the broader spirit and scope of the various embodiments. For example, the various devices and modules described herein may be enabled and operated using hardware circuitry (e.g., CMOS-based logic circuitry), firmware, software or any combination of hardware, firmware, and software (e.g., embodied in a non-transitory machine-readable medium). For example, the various electrical structures and methods may be embodied using transistors, logic gates, and electrical circuits (e.g., application-specific integrated (ASIC) circuitry and/or Digital Signal Processor (DSP) circuitry).

In addition, it will be appreciated that the various operations, processes and methods disclosed herein may be embodied in a non-transitory machine-readable medium and/or a machine-accessible medium compatible with a data processing system (e.g., computing device 120$_{1-N}$, cloud computing network 106, the array of sensors 104$_{1-N}$).

Accordingly, the specification and drawings are to be regarded in an illustrative rather than a restrictive sense.

What is claimed is:

1. A safety system of an occupiable structure, comprising:

a breathable-air supply system to facilitate delivery of breathable air from a source of compressed air;

a fill station in a fire-rated evacuation area of the occupiable structure to supply the breathable air to an emergency personnel;

a smart lock associated with the breathable-air supply system to automatically unlock at least one location of the breathable-air supply system usable by the emergency personnel to access the breathable air during an emergency state of the occupiable structure; and a sensor associated with the breathable-air supply system to detect the emergency state of the occupiable structure and generate a signal causing the smart lock to automatically unlock the at least one location of the fill station, responsive to detection of the emergency state of the occupiable structure, wherein the emergency state of the occupiable structure corresponds at least one of a level of ambient carbon dioxide, a level of ambient oxygen, a level of nitrogen, a level of ambient carbon monoxide, condensed hydrocarbon, a moisture concentration, a temperature, power parameters, air leakage, or a presence of smoke.

2. The safety system of claim 1, wherein:

the smart lock associated with the breathable-air supply system automatically locks the at least one location of the breathable-air supply system required by the emergency personnel to access the breathable air when the emergency state ends and a normal state of the occupiable structure is detected.

3. The safety system of claim 1, wherein the breathable-air supply system is housed in an air storage sub-system appurtenant to the occupiable structure.

4. The safety system of claim 1, wherein a lock state and an unlock state of the smart lock is determined based on a sensory data of the sensor associated with the breathable-air supply system.

5. The safety system of claim 4, wherein the at least one location of the breathable-air supply system required by the emergency personnel to access the breathable air during the emergency state of the occupiable structure includes a video camera that captures a visual recording when the at least one location is being accessed by anyone in the unlock state.

6. The safety system of claim 5, wherein the video camera also records an audio communication ambient to the at least one location.

7. The safety system of claim 6, wherein at least one of: the visual recording and the audio communication is communicated to at least one of: a remote fire command center, an onsite fire command center and a fire command room.

8. The safety system of claim 6, wherein the breathable-air supply system automatically transcribes the audio communication and/or the visual recording of the at least one location.

9. The safety system of claim 7, wherein the breathable-air supply system automatically provides a situational awareness recommendation to the at least one of: the remote fire command center, the onsite fire command center and the fire command room using an artificial intelligence algorithm based on a regression analysis of the sensory data.

10. The safety system of claim 1, wherein the sensor further comprises:

a carbon monoxide sensor which triggers the emergency state when a level of ambient carbon monoxide exceeds a first predetermined threshold value.

11. The safety system of claim 1, wherein the sensor further comprises:

a carbon dioxide sensor that triggers the emergency state when a level of ambient carbon dioxide exceeds a second predetermined threshold value.

12. The safety system of claim 1, wherein the sensor further comprises:

an oxygen level sensor that triggers the emergency state when a level of ambient oxygen falls outside a predetermined range of values.

13. The safety system of claim 1, wherein the sensor further comprises:

a nitrogen level sensor that triggers the emergency state when a level of nitrogen falls below a third predetermined threshold value and when the level of nitrogen rises above a fourth predetermined threshold value.

14. The safety system of claim 1, wherein the sensor further comprises:

a hydrocarbon sensor that triggers the emergency state when a condensed hydrocarbon content exceeds a fifth predetermined threshold value.

15. The safety system of claim 1, wherein the sensor further comprises:

a moisture sensor that triggers the emergency state when a moisture concentration exceeds a sixth predetermined threshold value.

16. The safety system of claim 1, wherein the sensor further comprises:

a pressure sensor that triggers the emergency state when a pressure falls below a seventh predetermined threshold value of a maintenance pressure specified in a fire code.

17. The safety system of claim 1, wherein at least one of:

the at least one location of the breathable-air supply system comprises at least one of: an exterior mobile air connection panel, an air monitoring closet, an air monitoring room, an air storage closet, an air storage room, a fire command center, a fire command room, a fire alarm panel, a computing device executing a software application thereon, a fill station of the occupiable structure, and a temporarily established fill station connected to a compressed air source during the emergency state, the smart lock associated with the breathable-air supply system automatically unlocks each location of the breathable-air supply system usable during the emergency state of the occupiable structure, the fire-rated evacuation area of the occupiable structure is a stairwell, and the sensor associated with the breathable-air supply system comprises an array of sensors.

18. A method of a safety system of an occupiable structure, comprising:

facilitating a breathable-air supply system to deliver breathable air from a source of compressed air;

supplying the breathable air to an emergency personnel through a fill station in a fire-rated evacuation area of the occupiable structure;

automatically unlocking a smart lock associated with the breathable-air supply system to permit entry to at least one location of the breathable-air supply system usable by the emergency personnel to access the breathable air during an emergency state of the occupiable structure;

integrating a sensor within the breathable-air supply system to detect the emergency state based on a threshold level of an air quality parameter; and configuring the sensor to trigger an alert signal to automatically unlock the smart lock on the detection of the emergency state and generate the alert signal causing the smart lock to automatically unlock the at least one location of the fill station, responsive to detection of the emergency state of the occupiable structure, wherein the emergency state of the occupiable structure corresponds at least one of a level of ambient carbon dioxide, a level of ambient oxygen, a level of nitrogen, a level of ambient carbon monoxide, condensed hydrocarbon, a moisture concentration, a temperature, power parameters, air leakage, or a presence of smoke.

19. The method of claim 18, comprising automatically locking the at least one location of the breathable-air supply system required by the emergency personnel to access the breathable air when the emergency state ends and a normal state of the occupiable structure is detected by the sensor.

20. The method of claim 18, further comprising automatically recording, through a video camera, an audiovisual incident to communicate to at least one of: a remote fire command center, an onsite fire command center and a fire command room through a cloud computing network, when the at least one location is accessed by at least one of: an unauthorized person and the emergency personnel in an unlock state of the smart lock.

21. The method of claim 20, comprising automatically providing, through the breathable-air supply system, a situational awareness recommendation to the at least one of: the remote fire command center, the onsite fire command center and the fire command room using an artificial intelligence algorithm based on a regression analysis of a sensory data of the sensor.

22. The method of claim 18, comprising providing the sensor with at least one of: a carbon monoxide sensor, a carbon dioxide sensor, an oxygen level sensor, a nitrogen level sensor, a hydrocarbon sensor, a moisture sensor, and a pressure sensor.

23. The method of claim 20, comprising generating a trigger signal to alert at least one of: the emergency personnel, the remote fire command center, the onsite fire command center and the fire command room based on detecting tampering of the smart lock associated with the breathable-air supply system.

24. The method of claim 18, comprising:

the at least one location comprising at least of: an exterior mobile air connection panel, an air monitoring closet, an air monitoring room, an air storage closet, an air storage room, a fire command center, a fire command room, a fire alarm panel, a computing device executing a software application thereon, a fill station of the occupiable structure, and a temporarily established fill station connected to a compressed air source during the emergency state;

the smart lock associated with the breathable-air supply system automatically unlocking each location of the breathable-air supply system usable during the emergency state of the occupiable structure;

the fire-rated evacuation area of the occupiable structure is a stairwell;

the sensor within the breathable-air supply system comprises an array of sensors; and accessing the smart lock using at least one of a Radio Frequency Identification (RFID) system, a smart card, a key fob access, a Non-Fungible Token (NFT), a physical key, a biometric system, and a web-based identification system.

25. The method of claim 22, comprising automatically triggering the emergency state using the carbon monoxide sensor when a level of ambient carbon monoxide exceeds a first predetermined threshold value.

26. The method of claim 22, comprising automatically triggering the emergency state using the carbon dioxide sensor when a level of ambient carbon dioxide exceeds a second predetermined threshold value.

27. The method of claim 22, comprising automatically triggering the emergency state using the oxygen level sensor when a level of ambient oxygen falls outside a predetermined range of values.

28. The method of claim 22, comprising automatically triggering the emergency state using the nitrogen level sensor when a level of nitrogen falls below a third predetermined threshold value and when the level of nitrogen rises above a fourth predetermined threshold value.

29. The method of claim 22, comprising automatically triggering the emergency state using the hydrocarbon sensor when a condensed hydrocarbon content exceeds a fifth predetermined threshold value.

30. The method of claim 22, comprising automatically triggering the emergency state using the moisture sensor when a moisture concentration exceeds a sixth predetermined threshold value.

31. The method of claim 22, comprising automatically triggering the emergency state using the pressure sensor when a pressure falls below a seventh predetermined threshold value.

32. A method of a safety system of an occupiable structure, comprising:

facilitating a breathable-air supply system to deliver breathable air from a source of compressed air;

supplying the breathable air to an emergency personnel through a fill station in a fire-rated evacuation area of the occupiable structure;

automatically unlocking a smart lock associated with the breathable-air supply system to permit entry to each location of the breathable-air supply system usable by the emergency personnel to access the breathable air during an emergency state of the occupiable structure;

integrating a sensor within the breathable-air supply system to detect the emergency state based on a threshold level of an air quality parameter; and configuring the sensor to trigger an alert signal to automatically unlock the smart lock on the detection of the emergency state and generate the alert signal causing the smart lock to automatically unlock the at least one location of the fill station, responsive to detection of the emergency state of the occupiable structure, wherein the emergency state of the occupiable structure corresponds at least one of a level of ambient carbon dioxide, a level of ambient oxygen, a level of nitrogen, a level of ambient carbon monoxide, condensed hydrocarbon, a moisture concentration, a temperature, power parameters, air leakage, or a presence of smoke.

* * * * *